(12) United States Patent
Galor Gluskin

(10) Patent No.: US 11,245,878 B2
(45) Date of Patent: Feb. 8, 2022

(54) QUAD COLOR FILTER ARRAY IMAGE SENSOR WITH APERTURE SIMULATION AND PHASE DETECTION

(71) Applicant: QUALCOMM Incorporated, San Diego, CA (US)

(72) Inventor: Micha Galor Gluskin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 16/664,005

(22) Filed: Oct. 25, 2019

(65) Prior Publication Data
US 2020/0280704 A1 Sep. 3, 2020

Related U.S. Application Data

(60) Provisional application No. 62/812,229, filed on Feb. 28, 2019.

(51) Int. Cl.
*H04N 5/228* (2006.01)
*H04N 9/04* (2006.01)
*H04N 5/232* (2006.01)
*G06T 7/50* (2017.01)
*G06T 5/50* (2006.01)
*G06T 5/00* (2006.01)

(52) U.S. Cl.
CPC ......... *H04N 9/04559* (2018.08); *G06T 5/009* (2013.01); *G06T 5/50* (2013.01); *G06T 7/50* (2017.01); *H04N 5/23229* (2013.01); *H04N 5/232122* (2018.08); *H04N 5/232125* (2018.08); *G06T 2207/20208* (2013.01); *G06T 2207/20216* (2013.01)

(58) Field of Classification Search
CPC ......... H04N 9/04559; H04N 5/232125; H04N 5/232122; H04N 5/23229; G06T 7/50; G06T 5/009; G06T 5/50; G06T 2207/20208; G06T 2207/20216
USPC ...................................................... 348/222.1
See application file for complete search history.

(56) References Cited

U.S. PATENT DOCUMENTS

2014/0043508 A1\* 2/2014 Kawamura ...... H04N 5/232122
 348/280
2017/0094210 A1\* 3/2017 Galor Gluskin ......... G02B 7/09
2018/0316878 A1\* 11/2018 Zhou .................... H04N 5/2351

\* cited by examiner

*Primary Examiner* — Usman A Khan
(74) *Attorney, Agent, or Firm* — Qualcomm Incorporated

(57) ABSTRACT

Aspects of the present disclosure relate to quad color filter array image sensors. A quad color filter array (CFA) image sensor is configured to capture image data. The quad CFA image sensor includes a quad CFA and an image sensor coupled to the quad CFA. The image sensor includes a plurality of quads including a plurality of pixels. For each quad, each pixel of the plurality of pixels is coupled to a same color filter of the plurality of color filters, a first pixel of the plurality of pixels is associated with a first exposure region of the quad and corresponds to a first aperture size, a second pixel of the plurality of pixels is associated with a second exposure region of the quad and corresponds to a second aperture size, and at least two pixels of the plurality of pixels are configured as phase detection pixels.

30 Claims, 31 Drawing Sheets

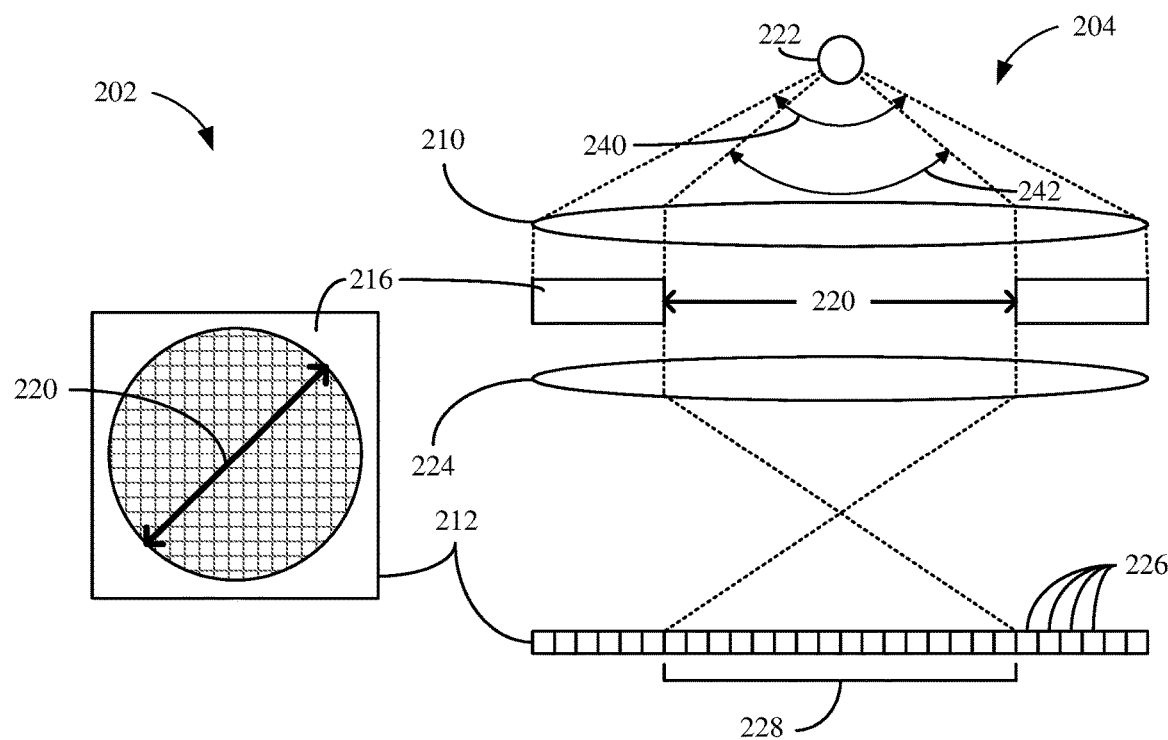
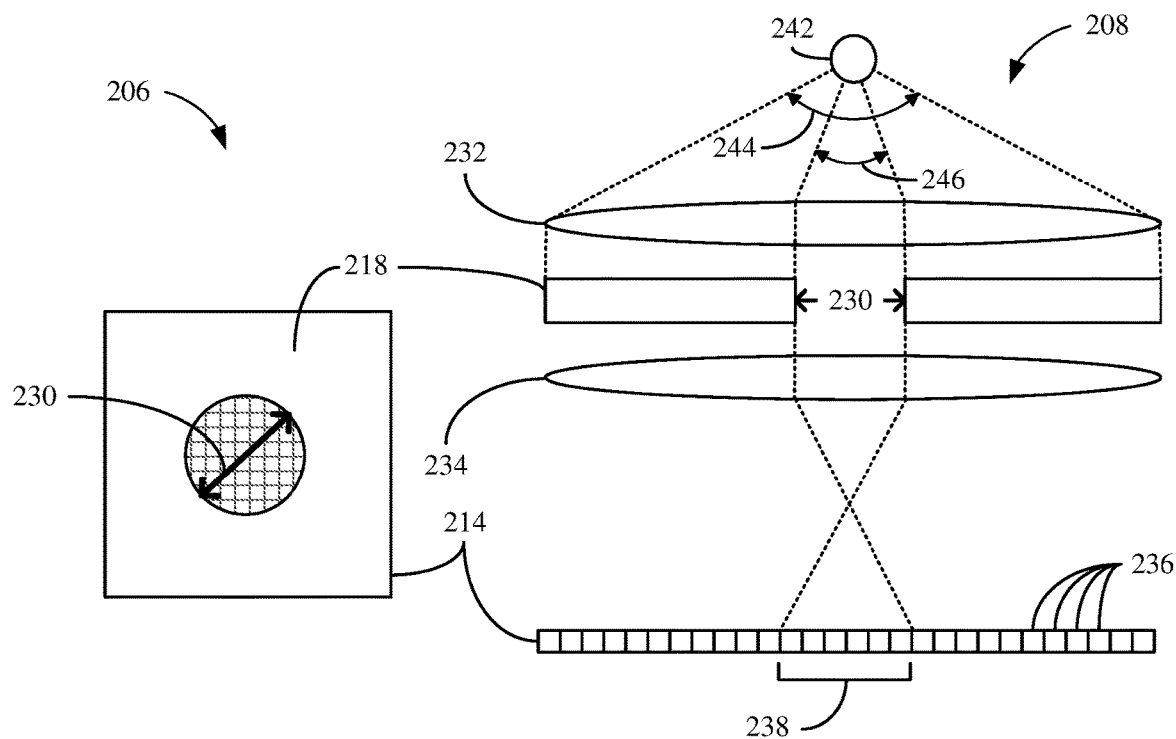
FIG. 2

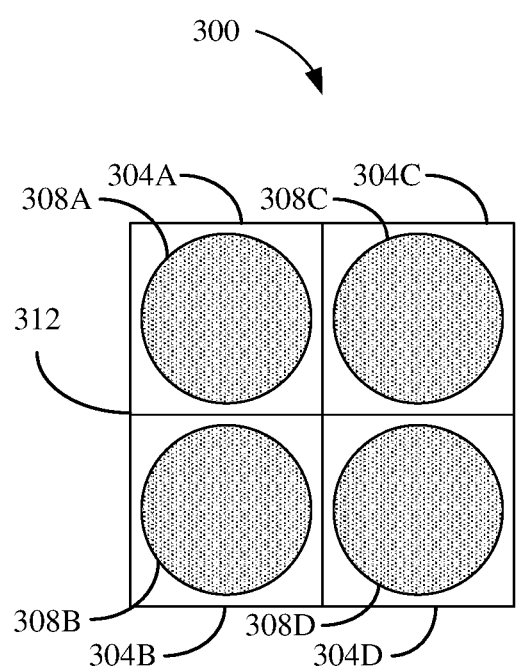
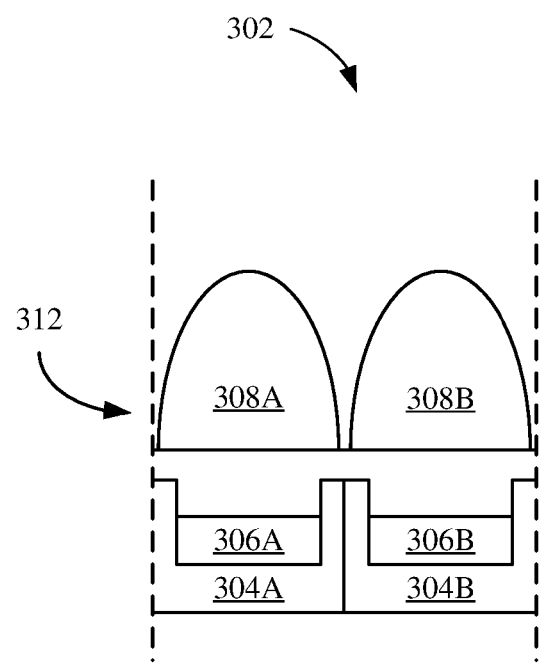
FIG. 3A                    FIG. 3B

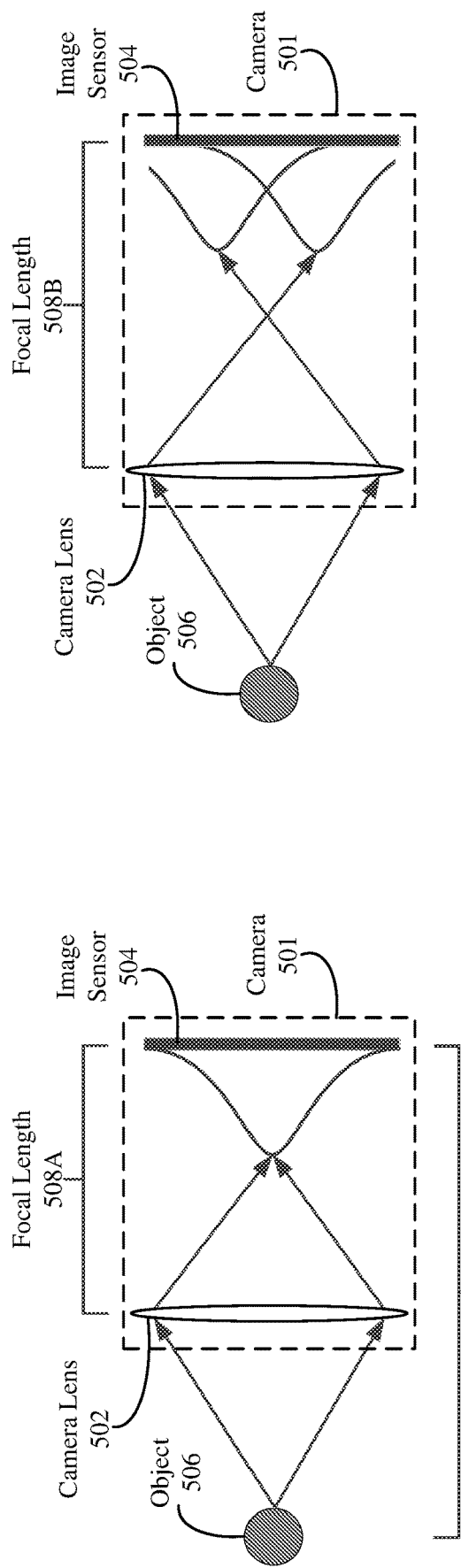
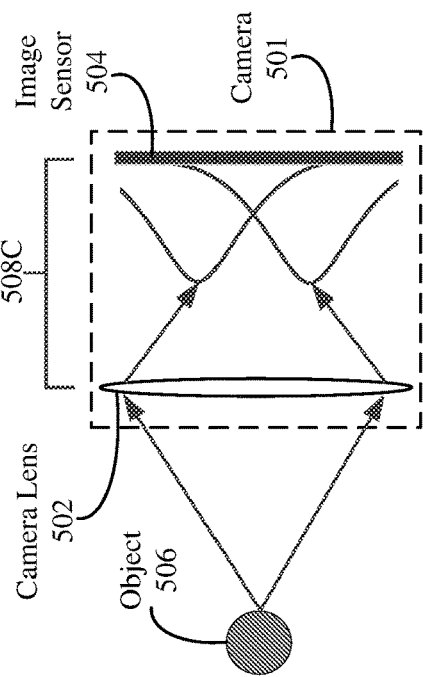
FIG. 5A
FIG. 5B
FIG. 5C

2900

```
┌─────────────────────────────────────────────────────────────────────┐
│ Capture one or more frames of image data by a quad CFA image sensor. 2902 │
│  ┌───────────────────────────────────────────────────────────────┐  │
│  │ Capture image data by a first non-PD pixel of each quad. 2904 │  │
│  └───────────────────────────────────────────────────────────────┘  │
│  ┌───────────────────────────────────────────────────────────────┐  │
│  │ Capture image data by a second non-PD pixel of each quad. 2906│  │
│  └───────────────────────────────────────────────────────────────┘  │
│  ┌───────────────────────────────────────────────────────────────┐  │
│  │ Capture image data from a first perspective by a first PD pixel of each quad. 2908 │  │
│  └───────────────────────────────────────────────────────────────┘  │
│  ┌───────────────────────────────────────────────────────────────┐  │
│  │ Capture image data from a second perspective by a second PD pixel of each quad. 2910 │  │
│  └───────────────────────────────────────────────────────────────┘  │
└─────────────────────────────────────────────────────────────────────┘
                                    ↓
┌─────────────────────────────────────────────────────────────────────┐
│ Process the one or more frames of captured image data. 2912        │
│  ┌───────────────────────────────────────────────────────────────┐  │
│  │ Perform aperture simulation using the one or more frames of captured image data to simulate capturing image data using different size apertures. 2914 │  │
│  │  ┌─────────────────────────────────────────────────────────┐  │  │
│  │  │ Generate an HDR image using aperture simulation to simulate capturing frames of image data using different size apertures. 2916 │  │  │
│  │  └─────────────────────────────────────────────────────────┘  │  │
│  └───────────────────────────────────────────────────────────────┘  │
│  ┌───────────────────────────────────────────────────────────────┐  │
│  │ Detect one or more phases from the captured image data for a depth based operation. 2918 │  │
│  │  ┌─────────────────────────────────────────────────────────┐  │  │
│  │  │ Perform PDAF for the image sensor. 2920                 │  │  │
│  │  └─────────────────────────────────────────────────────────┘  │  │
│  └───────────────────────────────────────────────────────────────┘  │
└─────────────────────────────────────────────────────────────────────┘
```

FIG. 29

QUAD COLOR FILTER ARRAY IMAGE SENSOR WITH APERTURE SIMULATION AND PHASE DETECTION

RELATED APPLICATION

This application claims priority to U.S. Provisional Patent Application No. 62/812,229, titled "QUAD BAYER APERTURE SIMULATION WITH DENSE PHASE DETECTION AUTOFOCUS," filed Feb. 28, 2019, which is hereby incorporated by reference in its entirety.

TECHNICAL FIELD

This disclosure relates generally to systems and methods for capturing images using colored filter array (CFA) sensors.

BACKGROUND

Digital cameras may include a lens, an aperture, and an image sensor with a plurality of sensor pixels. Light flows through the lens and the aperture until reaching the image sensor. Each sensor pixel may include a photodiode which captures image data based on sensing the incoming light. One or more processors may generate an image based on the captured image data. A depth of field is a portion of a scene in a range of distances from the camera that the scene is in-focus for captures by the image sensor. Portions of an image associated with objects of the scene within the depth of field appear in-focus, while portions of the image associated with objects outside the depth of field may appear out-of-focus.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure are regarding a quad color filter array (QCFA) image sensor (such as a quad Bayer color filter array image sensor). In some aspects, an example device may include a quad color filter array including a plurality of color filters and an image sensor coupled to the quad color filter array. The image sensor may include a plurality of quads including a plurality of pixels. For each quad, each pixel of the plurality of pixels is coupled to a same color filter of the plurality of color filters, a first pixel of the plurality of pixels is associated with a first exposure region of the quad and corresponds to a first aperture size, a second pixel of the plurality of pixels is associated with a second exposure region of the quad and corresponds to a second aperture size, and at least two pixels of the plurality of pixels are configured as phase detection pixels.

In some other aspects, an example method may include capturing one or more frames of image data by a quad color filter array image sensor. The quad color filter array image sensor may include a quad color filter array including a plurality of color filters, and an image sensor coupled to the quad color filter array. The image sensor may include a plurality of quads including a plurality of pixels. For each quad, each pixel of the plurality of pixels is coupled to a same color filter of the plurality of color filters, a first pixel of the plurality of pixels is associated with a first exposure region of the quad and corresponds to a first aperture size, a second pixel of the plurality of pixels is associated with a second exposure region of the quad and corresponds to a second aperture size, and at least two pixels of the plurality of pixels are configured as phase detection pixels.

In some further aspects, a non-transitory computer readable medium including instructions that, when executed by one or more processors of a device, may cause the device to capture one or more frames of image data by a quad color filter array image sensor. The quad color filter array image sensor may include a quad color filter array including a plurality of color filters, and an image sensor coupled to the quad color filter array. The image sensor may include a plurality of quads including a plurality of pixels. For each quad, each pixel of the plurality of pixels is coupled to a same color filter of the plurality of color filters, a first pixel of the plurality of pixels is associated with a first exposure region of the quad and corresponds to a first aperture size, a second pixel of the plurality of pixels is associated with a second exposure region of the quad and corresponds to a second aperture size, and at least two pixels of the plurality of pixels are configured as phase detection pixels.

In some other aspects, a device may include means for capturing one or more frames of image data by a quad color filter array image sensor. The quad color filter array image sensor may include a quad color filter array including a plurality of color filters, and an image sensor coupled to the quad color filter array. The image sensor may include a plurality of quads including a plurality of pixels. For each quad, each pixel of the plurality of pixels is coupled to a same color filter of the plurality of color filters, a first pixel of the plurality of pixels is associated with a first exposure region of the quad and corresponds to a first aperture size, a second pixel of the plurality of pixels is associated with a second exposure region of the quad and corresponds to a second aperture size, and at least two pixels of the plurality of pixels are configured as phase detection pixels.

BRIEF DESCRIPTION OF THE DRAWINGS

Aspects of the present disclosure are illustrated by way of example, and not by way of limitation, in the figures of the accompanying drawings and in which like reference numerals refer to similar elements.

FIG. 2 is a depiction of example image sensors coupled to different masks.

FIG. 3A is a depiction of a top down view of a 2×2 patch of sensor pixels of an example image sensor.

FIG. 3B is a depiction of a cross-sectional view of the 2×2 patch of the example image sensor in FIG. 3A.

FIG. 5A is a depiction of a camera including a camera lens at a focal length so that an object is in focus.

FIG. 5B is a depiction of the camera including the camera lens at too long of a focal length so that the object is out of focus.

FIG. 5C is a depiction of the camera including the camera lens at too short of a focal length so that the object is out of focus.

FIG. 29 is an illustrative flow chart depicting an example operation for capturing image data using a quad Bayer image sensor with phase detection and aperture simulation functionality.

DETAILED DESCRIPTION

Figure 1:
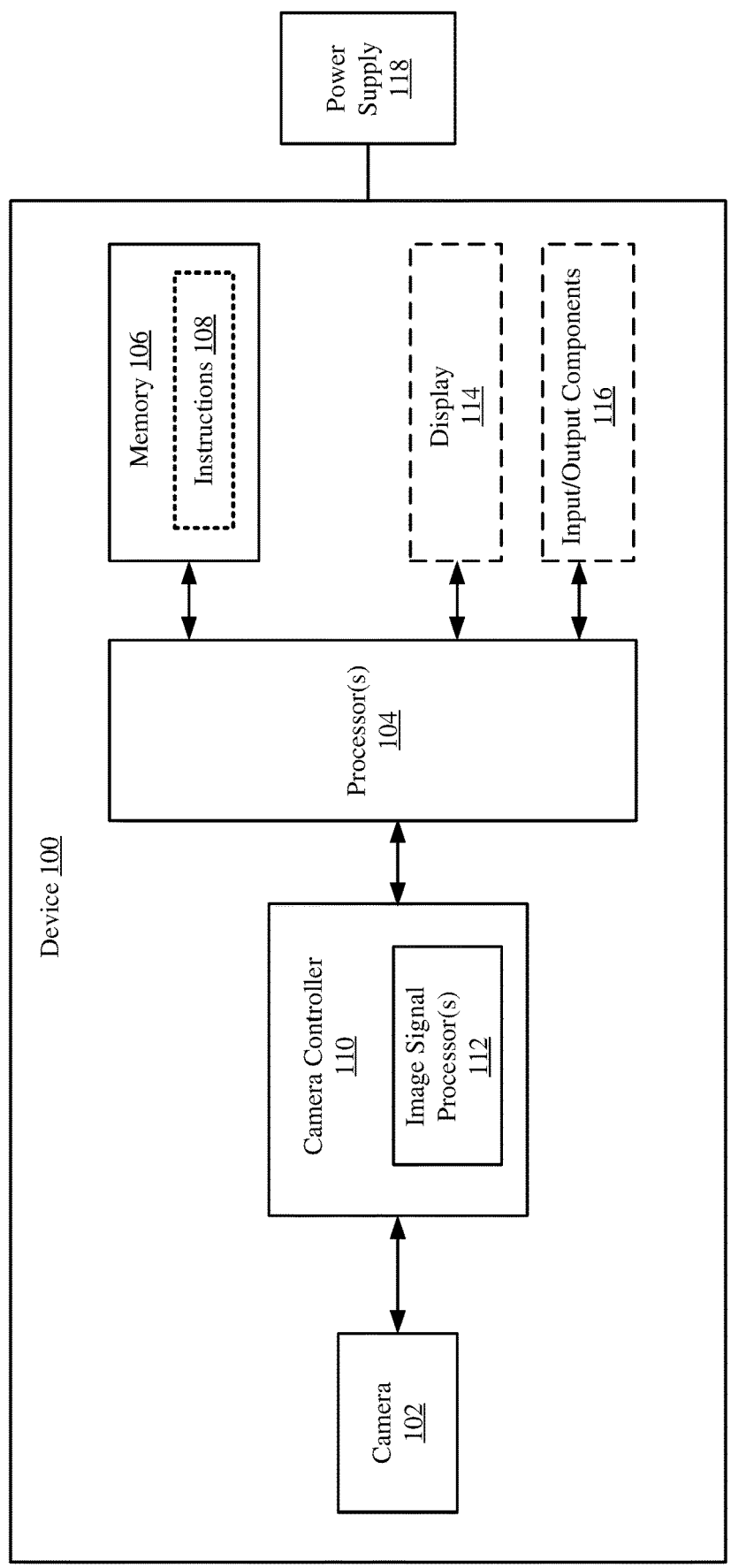
FIG. 1 is a block diagram of an example device including or coupled to a camera.

Aspects of the present disclosure are regarding a quad color filter array (CFA) image sensor (such as a quad Bayer CFA image sensor). The quad CFA image sensor may include pixel-based aperture simulation and phase detection capabilities (such as for phase detection autofocus (PDAF)). In some implementations, the image sensor is configured for single capture based high dynamic range (HDR) images as well as PDAF. An example image sensor may include a quad Bayer pattern tile of size 4×4 sensor pixels with a plurality of patches of size 2×2 sensor pixels. Each patch may include the same color filter among the sensor pixels and different size exposure zones between the sensor pixels (e.g., based on different aperture sizes in the mask over the patch of sensor pixels). In this manner, the image sensor, based on aperture simulation (AS), may be used for single capture based HDR imaging, and the image sensor may provide dense phase detection (PD) (such as dual pixel (2PD) sensor level quality). AS may be used for generating HDR images without the need for a mechanical actuator (such as a voice-coil motor) to adjust the aperture size, allowing for simpler camera designs. AS may also be used for adjusting a depth of field for an image sensor or other exposure-based operations that would typically require adjusting an aperture for the image sensor. These and other aspects of the example implementations are discussed in more detail below.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, techniques, algorithms, logic blocks, processing and other symbolic representations of operations on data bits within a computer memory. In the present disclosure, a procedure, technique, algorithm, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable image processing device (such as cameras, smartphones, tablets, laptop computers, or other devices) configured to capture or process images captured using one or more image sensors, such as one or more quad CFA (QCFA) image sensors. While described below with respect to a device having or coupled to one camera, aspects of the present disclosure are applicable to devices having any number of cameras, and are therefore not limited to devices having one camera.

The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific implementations. For example, a system may be implemented on one or more printed circuit boards or other substrates and may have movable or static components. While the below description and examples use the term "system" to describe various aspects of this disclosure, the term "system" is not limited to a specific configuration, type, or number of objects.

FIG. 1 is a block diagram of an example device 100 including or coupled to a camera 102. The example device 100 may also include one or more processors 104, a memory 106 storing instructions 108, and a camera controller 110. The device 100 may optionally include (or be coupled to) a display 114 and a number of input/output (I/O) components 116. The device 100 may include additional features or components not shown. For example, a wireless interface, which may include a number of transceivers and a baseband processor, may be included for a wireless communication device (e.g., a smartphone or a tablet). The example device 100 is for illustrative purposes in describing aspects of the disclosure, and the disclosure is not limited to any specific examples or illustrations herein, including the example device 100.

A camera 102 may be capable of capturing individual image frames (such as still images) and/or a succession of image frames for video. The camera 102 may include a single image sensor and camera lens, or be a dual camera module or any other suitable module with multiple image sensors and lenses. The term "camera" may mean a digital image sensor of a dedicated camera assembly, a digital image sensor mounted to a device, a digital image sensor communicably coupled to a device or other suitable configurations.

The memory 106 may be a non-transient or non-transitory computer readable medium storing computer-executable instructions 108 to perform all or a portion of one or more operations described herein. The device 100 may also include or be coupled to a power supply 118.

The one or more processors 104 may be one or more suitable processors capable of executing scripts or instructions of one or more software programs (such as instructions 108) stored within the memory 106. In some aspects, the one or more processors 104 may be one or more general purpose processors that execute instructions 108 to cause the device 100 to perform any number of functions or operations. In additional or alternative aspects, the one or more processors 104 may include integrated circuits or other hardware to perform functions or operations without the use of software. While shown to be coupled to each other via the one or more processors 104 in the example of FIG. 1, the one or more processors 104, the memory 106, the camera controller 110, the optional display 114, and the optional I/O components 116 may be coupled to one another in various arrangements. For example, the one or more processors 104, the memory 106, the camera controller 110, the optional display 114, and/or the optional I/O components 116 may be coupled to each other via one or more local buses (not shown for simplicity).

The display 114 may be any suitable display or screen allowing for user interaction and/or to present items for viewing by a user (such as final images, video, a preview image, etc.). In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone and speakers, and so on. The display 114 and/or the I/O components 116 may provide a preview image to a user and/or receive a user input for adjusting one or more settings of the camera 102 (such as selecting and/or deselecting a region of interest of a displayed preview image for an AF operation).

The camera controller 110 may include one or more image signal processors 112, which may be one or more image signal processors to process captured image data provided by the camera 102. In some example implementations, the camera controller 110 (such as the one or more image signal processors 112) may also control operation of the camera 102. In some aspects, the one or more image signal processors 112 may execute instructions from a memory (such as instructions 108 from the memory 106 or instructions stored in a separate memory coupled to the one or more image signal processors 112) to process image frames or video from captured image data from the camera 102. In other aspects, the one or more image signal processors 112 may include specific hardware to process image frames or video from the captured image data from the camera 102. The one or more image signal processors 112 may alternatively or additionally include a combination of specific hardware and the ability to execute software instructions.

The disclosure may describe a device or system component in the singular, but more than one component may be contemplated in describing a device or system component in the singular. For example, a camera 102 may correspond to one camera or a plurality of cameras, a processor 104 may correspond to one processor or a plurality of processors, a memory 106 may correspond to one memory or a plurality of memories, an image signal processor 112 may correspond to one image signal processor or a plurality of image signal processors, etc. While the following examples, operations, processes, methods, etc. are described with respect to the device 100 in FIG. 1, any suitable device or system may be used.

A depth of field is a portion of a scene in a range of distances from the camera 102 that the scene is in-focus for captures by the image sensor of the camera 102. The depth of field may be defined by a minimum distance and a maximum distance from the camera 102. Objects not within the minimum distance and the maximum distance from the camera 102 may appear out of focus in images generated from captured image data from the image sensor, while objects within the minimum distance and the maximum distance from the camera 102 may appear in focus in images generated from captured image data from the image sensor. A depth of field associated with a camera 102 may be based on a size of a mask aperture and features of one or more lenses coupled to the camera's image sensor. Regarding aperture size and depth of field, the amount of light received at an image sensor is based on the size of the aperture. An image sensor coupled to a mask with a smaller size aperture may have a smaller area of dispersion of the received light onto the image sensor than if coupled to a mask with a larger size aperture. As a result, the image sensor coupled to the mask with the smaller size aperture may have a larger depth of field and thus be associated with less blurring of objects at different distances in the scene than if coupled to the mask with the larger size aperture.

FIG. 2 is a depiction of example image sensors 212 and 214 coupled to masks 216 and 218, respectively. Perspective 202 is a top down view of the image sensor 212 through the aperture 220 of the mask 216. Perspective 206 is a top down view of the image sensor 214 through the aperture 230 of the mask 218. The aperture 220 of mask 216 is larger than the aperture 230 of the mask 218, and a larger area of the image sensor 212 may be seen through the aperture 220 as compared to the image sensor 214 through the aperture 230.

Perspective 204 is a cross-sectional view of the image sensor 212 coupled to the mask 216 having the aperture 220. Perspective 208 is a cross-sectional view of the image sensor 214 coupled to the mask 218 having the aperture 230. The image sensor 212 is coupled to lenses 210 and 224 to direct the light received from object 222 to the image sensor 212. Light within the field 240 is received by the lens 210 and directed toward the mask 216. The mask 216 filters light outside the field 242, and the light within the field 242 passes through the aperture 220. The lens 224 then directs the light that passes through the aperture 220 to the image sensor 212. The image sensor 212 includes a plurality of sensor pixels 226. The light that passes through the aperture 220 is received by the sensor pixels 126 (e.g., sensed by the photosensitive surfaces of the sensor pixels) in region 228 of the image sensor 212.

Similarly, the image sensor 214 is coupled to lenses 232 and 234 to direct the light received from object 250 to the image sensor 214. Light within the field 244 is received by the lens 232 and directed toward the mask 218. The mask 218 filters light outside the field 246, and the light within the field 246 passes through the aperture 230. The lens 234 then directs the light that passes through the aperture 230 to the image sensor 214. The image sensor 214 includes a plurality of sensor pixels 236. The light that passes through the aperture 230 is received by the sensor pixels 236 (e.g., sensed by the photosensitive surfaces of the sensor pixels) in region 238 of the image sensor 214.

Since the aperture 230 is smaller than the aperture 220, the region 238 is smaller than the region 228 (thus including less sensor pixels) for receiving light from the objects 242 and 222, respectively. Increasing the number of sensor pixels receiving light from an object may be associated with increasing the blur of the object in generated images. Since the number of sensor pixels in the region 228 is greater than in region 238, the image sensor 212 may be associated with a larger blur of the object 222 than the blur of the object 250 associated with the image sensor 214 in generated images.

While an image sensor coupled to a mask with a smaller aperture might have a deeper depth of field than if coupled to a mask with a larger aperture, a larger aperture may be more effective than a smaller aperture in, e.g., low light or action photography by the camera. An image sensor coupled to a mask with a smaller aperture requires a longer exposure time than if coupled to a mask with a larger aperture to receive the same amount of light. Objects in the scene may move (local motion) or the camera may move (global motion). If the exposure time increases, objects or the camera may move more during the exposure time. As a result, increasing the exposure time may increase blurring in generated images caused by local motion or global motion.

A device may be configured to adjust the aperture size of a camera via a mechanical actuator, such as a voice-coil motor (VCM). Referring back to FIG. 2, the VCM may be configured to adjust an aperture to the size of aperture 220, to the size of aperture 230, and other aperture sizes. In this manner, the device may adjust the aperture size based on, e.g., ambient lighting of the scene, the photography mode of the camera, or the desired depth of field for generated images.

The intensity of the light received from different portions of a scene may vary. For example, a portion of a scene may be in shadows while another portion of the scene is in direct sunlight or includes a light source (such as a lamp). As a result, different portions of the scene may be associated with a different luminance for the same exposure time. To compensate for differing light intensities in the scene, the device 100 may use camera 102 to perform high dynamic range (HDR) imaging. Typical HDR imaging includes a camera capturing image data for multiple frames, with image data for each frame being captured using different exposure settings. For example, the camera may capture image data for three frames, with a first frame associated with a first exposure setting, a second frame associated with a second exposure setting, and a third frame associated with a third exposure setting. In this manner, the camera may receive a first amount of luminance using the first exposure setting for a first frame, may receive a second amount of luminance greater than the first amount of luminance using the second exposure setting for a second frame, and may receive a third amount of luminance less than the first amount of luminance using the third exposure setting for the third frame. The device may combine portions of the captured image data from the three frames to generate an HDR image. The HDR image therefore corresponds to a greater range of luminance than an image generated from a single frame of captured image data.

A device may adjust the exposure setting of a camera by adjusting the exposure time of the image sensor and/or the aperture size of the camera. For example, if the camera includes a VCM to adjust the aperture size, the device may adjust the aperture size via the VCM so that the camera captures image data for a first frame using a first aperture size, captures image data for a second frame using a second aperture size greater than the first aperture size, and captures image data for a third frame using a third aperture size smaller than the first aperture size. In another example, if there are no masks coupled to the image sensor (or a mask coupled to the image sensor includes a uniform aperture size), the device may adjust the length of exposure time of the image sensor of the camera for different frames and combine captured image data from the camera to generate an HDR image.

Including an actuator (such as a VCM) and the lenses associated with the actuator may increase the production cost of the camera. Additionally, the moving parts of an actuator may cause the camera to be more vulnerable to shocks or breakage. In some implementations, a camera (such as the camera 102) may be manufactured without an aperture actuator and additional lenses associated with the aperture. Instead, the camera 102 may include an image sensor with each sensor pixel coupled to an on-chip lens (OCL), such as a microlens (an OCL may be referred to herein as a microlens). The image sensor may include a plurality of microlenses, and a microlens may be coupled to each sensor pixel or a subset of sensor pixels of the image sensor.

FIG. 3A is a depiction of a top down view 300 of a 2×2 patch of sensor pixels 304A-304D of an example image sensor 312. The sensor pixel 304A may be coupled to a microlens 308A, the sensor pixel 304B may be coupled to a microlens 308B, the sensor pixel 304C may be coupled to a microlens 308C, and the sensor pixel 304D may be coupled to a microlens 308D. Each microlens 308A-308D may be configured to direct the light toward the corresponding pixel 304A-304D.

FIG. 3B is a depiction of a cross-sectional view 302 of the 2×2 patch of the example image sensor 312. The cross-sectional view 302 includes a view of pixel 304A and pixel 304B. The pixel 304A includes a photosensitive surface 306A to sense light directed by microlens 308A and received at the pixel 304A, and the pixel 304B includes a photosensitive surface 306B to sense light directed by microlens 308B and received at the pixel 304B. The pixel 304A and the pixel 304B may include a photodiode coupled to the surface 306A and the surface 306B, respectively, to generate a current based on the sensed light.

In general, each pixel may include a photosensitive surface to receive incoming light, which is measured by the pixel photodiode as a generated current indicating a photocharge (also referred to as a photometric) for the pixel. Each frame, the photodiode may generate a current and the current may be read out. The current may be converted to a voltage, and the voltage may be converted to a digital value indicating captured image data for the sensor pixel. In this manner, a device (such as the device 100) may receive, each frame, an array of captured image data corresponding to the array of sensor pixels of the image sensor (such as the image sensor of the camera 102). As used herein, a photosensitive surface, exposure region, pixel, photodiode, quad, tile, image sensor, etc. capturing image data or a frame of image data may include one or more photodiodes associated with a surface region, pixel, etc. providing a photometric and the photometric being converted to a digital value for processing during an image processing pipeline of the device 100. Capturing image data may also include processing or a portion of the processing functions associated with the image processing pipeline.

As noted above, three frames of captured image data (from the array of sensor pixels and after converting from currents to digital values) based on different exposure window lengths and/or aperture sizes may be used to generate an HDR image corresponding to an expanded luminance range. In some implementations, the device 100 may be configured to reduce the number of frames required for image data capture for HDR imaging. Additionally, the device 100 may be configured to adjust exposure settings without a mechanically adjustable aperture size (such as by a VCM) and without adjusting an exposure time. In some implementations, the image sensor of the camera 102 may be configured to simulate capturing image data using different aperture sizes at the pixel level without physically using a sensor level mask (referred to as aperture simulation herein). In some implementations, the image sensor may be configured for aperture simulation by including, in each pixel, two or more photodiodes with separate photosensitive surfaces.

Figure 4:
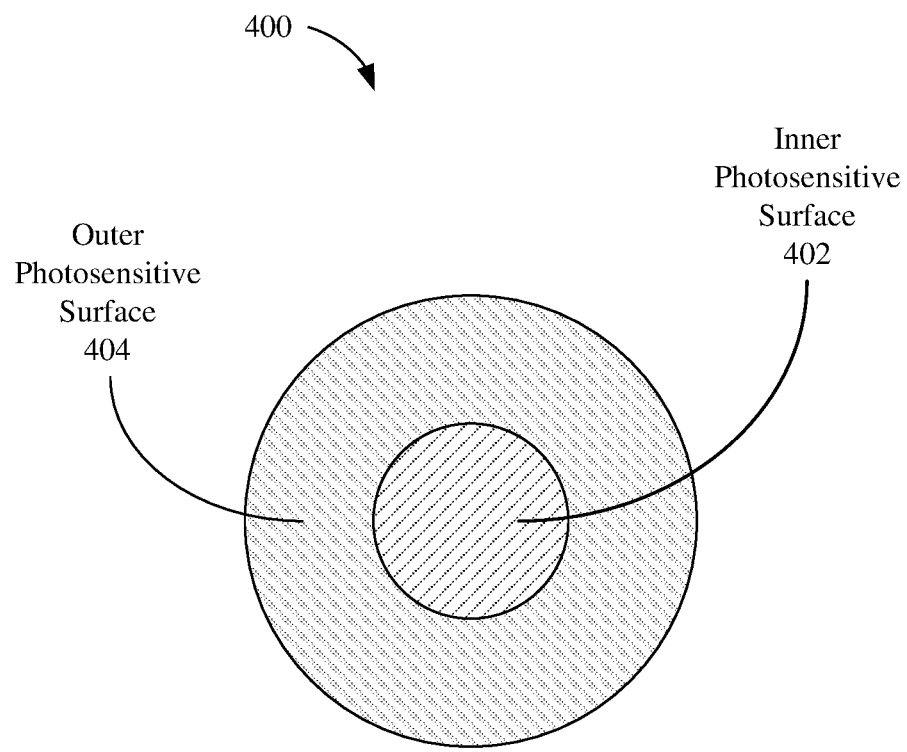
FIG. 4 is a depiction of an example sensor pixel including different exposure regions.

FIG. 4 is a depiction of an example sensor pixel 400 including photosensitive surfaces 402 and 404. Surface 402 may be an inner photosensitive surface of the sensor pixel 400, and surface 404 may be an outer photosensitive surface of the sensor pixel 400. The sensor pixel 400 may include a first photodiode coupled to the surface 402 and a second photodiode coupled to the surface 404. A device including an image sensor with the sensor pixel 400 may perform aperture simulation by selectively combining the captured image data from the first photodiode and the second photodiode.

In comparing the photosensitive surfaces 402 and 404, the surface 402 exclusive of the surface 404 for an image sensor including a plurality of pixels 400 may be associated with an image sensor coupled to a mask with a small size aperture. Conversely, the surface 402 plus the surface 404 may be associated with an image sensor coupled to a mask with a large size aperture. In this manner, a digital value representing the first photodiode's photocharge (for the inner photosensitive surface 402) may be captured image data associated with using a small aperture size, and a combination of digital values representing the photocharges from the first photodiode and the second photodiode may be captured image data associated with using a larger aperture size.

A device may also combine portions of the digital values (which may be referred to as image values or values) associated with the inner surface 402 and the outer surface 404 to simulate an adjustable aperture size. An example image value (IV) associated with the sensor pixel 400 using aperture simulation may be as defined in equation (1) below:

$$IV_{total} = a(IV_{inner} + IV_{outer}) + (1-a)IV_{inner} \text{ where } a \in [0,1] \quad (1)$$

Equation (1) may be simplified to equation (2) below:

$$IV_{total} = IV_{inner} + a*IV_{outer} \text{ where } a \in [0,1] \quad (2)$$

The device may simulate a smallest aperture size by setting a to zero ($IV_{inner}$), and the device may simulate a largest aperture size by setting a to one ($IV_{inner} + IV_{outer}$). Setting a to a value between zero and one simulates an aperture size between the smallest aperture size and the largest aperture size. To note, increasing a simulates increasing the aperture size at the pixel 400, with the increase in simulated aperture size linearly correlated to the increase in a. Other suitable correlations (e.g., logarithmic, exponential, step function, or other non-linear correlations) and other suitable relationships between $IV_{inner}$ and $IV_{outer}$ may be used in combining the values for aperture simulation.

The image sensor configured for performing pixel level aperture simulation allows for simulating adjusting an aperture size for the image sensor without the cost and size of components to include and mechanically adjust an aperture. However, including multiple photodiodes and photosensitive surfaces per sensor pixel in an image sensor may increase the expense and difficulty in producing the image sensors. Additionally, a microlens coupled to a sensor pixel may focus light passing through the microlens to a single focus point on the photosensitive surface(s) of the sensor pixel, and a single focus point may cause errors in sensings by different photodiodes of a sensor pixel having multiple photosensitive surfaces.

In some implementations, each pixel of an image sensor may include a photosensitive surface. In one example, each pixel may include only one photosensitive surface. The device 100 may be configured to perform aperture simulation for the camera 102 without the image sensor including multiple photosensitive surfaces per pixel (to perform operations including adjusting a depth of field of the camera 102, performing HDR imaging, etc.). The device 100 may also be configured to perform phase detection (PD), such as for one or more autofocus (AF) operations, for the camera 102. Portions of the scene closer or further than the depth of field may be out of focus, and therefore appear blurry in a generated image. The distance of the camera lens from the image sensor (the "focal length") is directly related to the distance, from the image sensor, of the scene that is in focus for generated images (the "focus distance"). Many devices are capable of adjusting the focal length, such as by moving the camera lens to adjust the distance between the camera lens and the image sensor (thereby adjusting the focus distance).

The device 100 may be configured to determine the focal length for the camera 102. For example, a user may touch an area of a preview image provided by the device 100 (such as a person or landmark in the previewed scene displayed on a display 114) to indicate the portion of the scene to be in focus in generated images. In response, the device 100 may automatically perform an AF operation to adjust the focal length of the camera 102 so that the portion of the scene is in focus for generated images. The camera 102 may then use the determined focal length for subsequent frames of capturing image data.

In some implementations, the device 100 or the camera 102 may perform phase detection autofocus (PDAF). For sensor-level PDAF, two instances of the light from an object passes through different portions of a camera lens. If the two instances of light align on the image sensor, the object is in focus. If the two instances are received at different locations of the image sensor, the object is out of focus.

FIG. 5A is a depiction of a camera 501 including a camera lens 502 at a focal length 508A (from the image sensor 504) so that an object 506 is in focus at focus distance 510. FIG. 5B is a depiction of the camera 501 including the camera lens 502 at too long of a focal length 508B so that the object 506 is out of focus. FIG. 5C is a depiction of the camera 501 including the camera lens 502 at too short of a focal length 508C so that the object 506 is out of focus. The camera 501 may be an example implementation of the camera 102 in FIG. 1.

Sensor-level PDAF includes determining the phase difference between two instances of light from the same object hitting the image sensor 504. For example, the phase difference may be a distance between the locations of the two instances hitting the image sensor 504 (such as a number of sensor pixels between the sensor pixels receiving the instances of light). In FIG. 5A, the phase difference is zero because the two instances (depicted by the arrows from object 506) align on the image sensor 504. In FIGS. 5B and 5C, the phase difference is greater than and less than zero, respectively, since the two instances do not align on the image sensor 504. The phase difference may be the number of pixels or another distance between the two peaks on the camera sensor 504 (with the curves indicating the intensity values of light from the object 506 measured at each sensor pixel).

Figure 6:
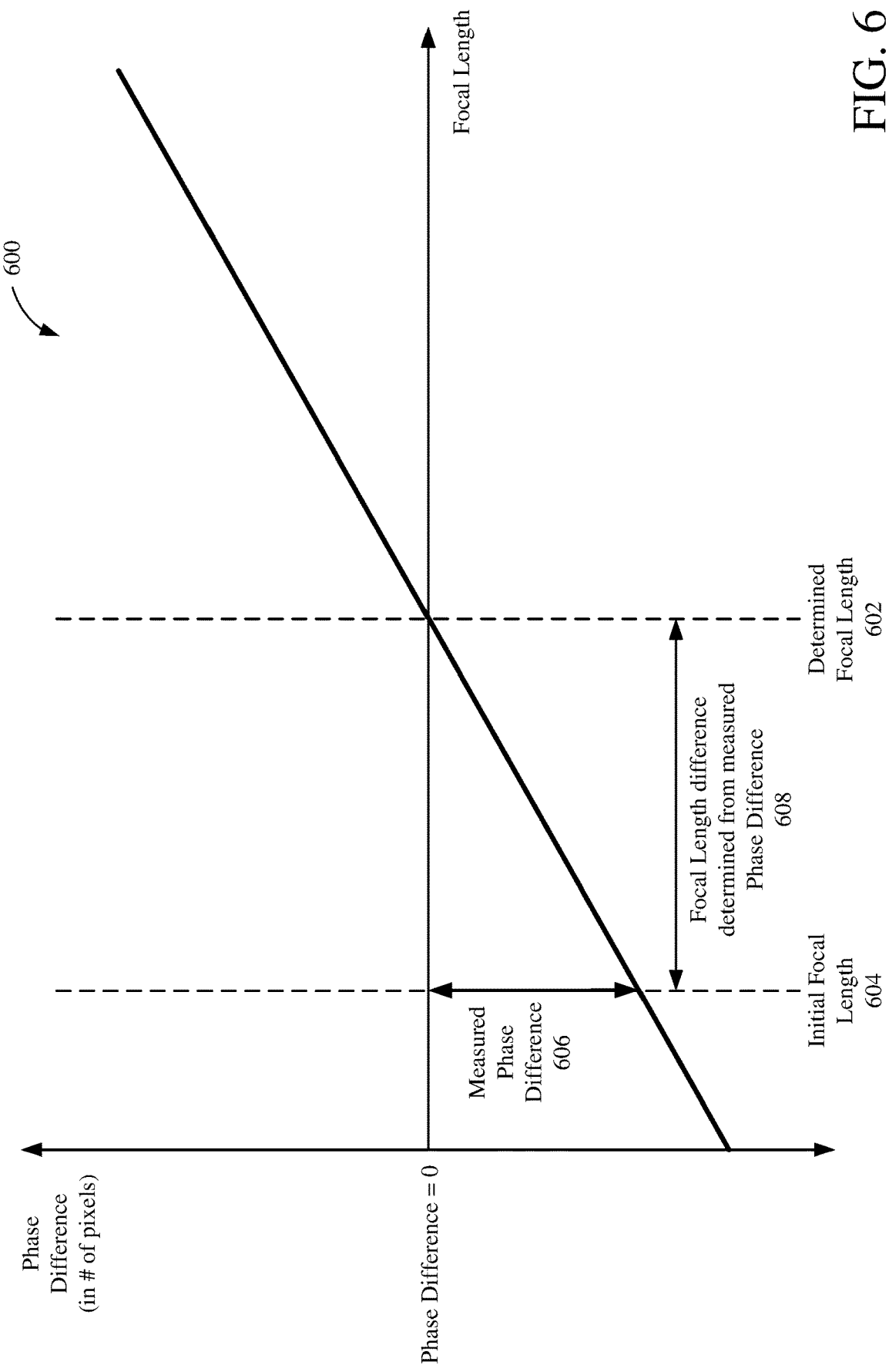
FIG. 6 is a depiction of an example correlation between focal length and phase difference for phase detection autofocus.

FIG. 6 is a depiction of an example correlation 600 between focal length and phase difference for PDAF. As illustrated, the correlation 600 is linear. If the phase difference 606 is measured for an initial focal length 604, the device 100 (performing PDAF) may determine the focal length difference 608 based on the slope and offset of the line indicating the correlation 600. If a camera lens 502 (FIGS. 5A-5C) is moveable, the camera 501 (FIGS. 5A-5C) may include an actuator (not shown) to move the camera lens 502 toward or away from the image sensor 504. In this manner, the focal length (and therefore the focus distance) may be adjusted by moving the camera lens 502 to a position corresponding to the determined focal length 602 in FIG. 6 (where the phase difference approaches zero).

FIGS. 5A-6 depict a sensor-level method of performing PDAF to illustrate aspects of PDAF. In some implementations, an image sensor may include a group (e.g., five percent) of pixels configured for performing pixel-level phase detection (such as for PDAF operations). The pixels may be referred to herein as phase detection (PD) pixels. For example, the five percent of PD pixels may be grouped into pairs (which may be referred to as PD pairs or PD pixel pairs), and the pixels of each PD pair are separated by a distance from each other. If the PD pairs are aligned horizontally, the left pixels of the PD pairs may capture image data from a first perspective, and the right pixels of the PD pairs may capture image data from a second perspective. The intensities of the light sensed from the first perspective and from the second perspective may be compared, and the differences in intensities may be used to determine one or more phase differences associated with one or more regions in the scene.

Figure 7A:
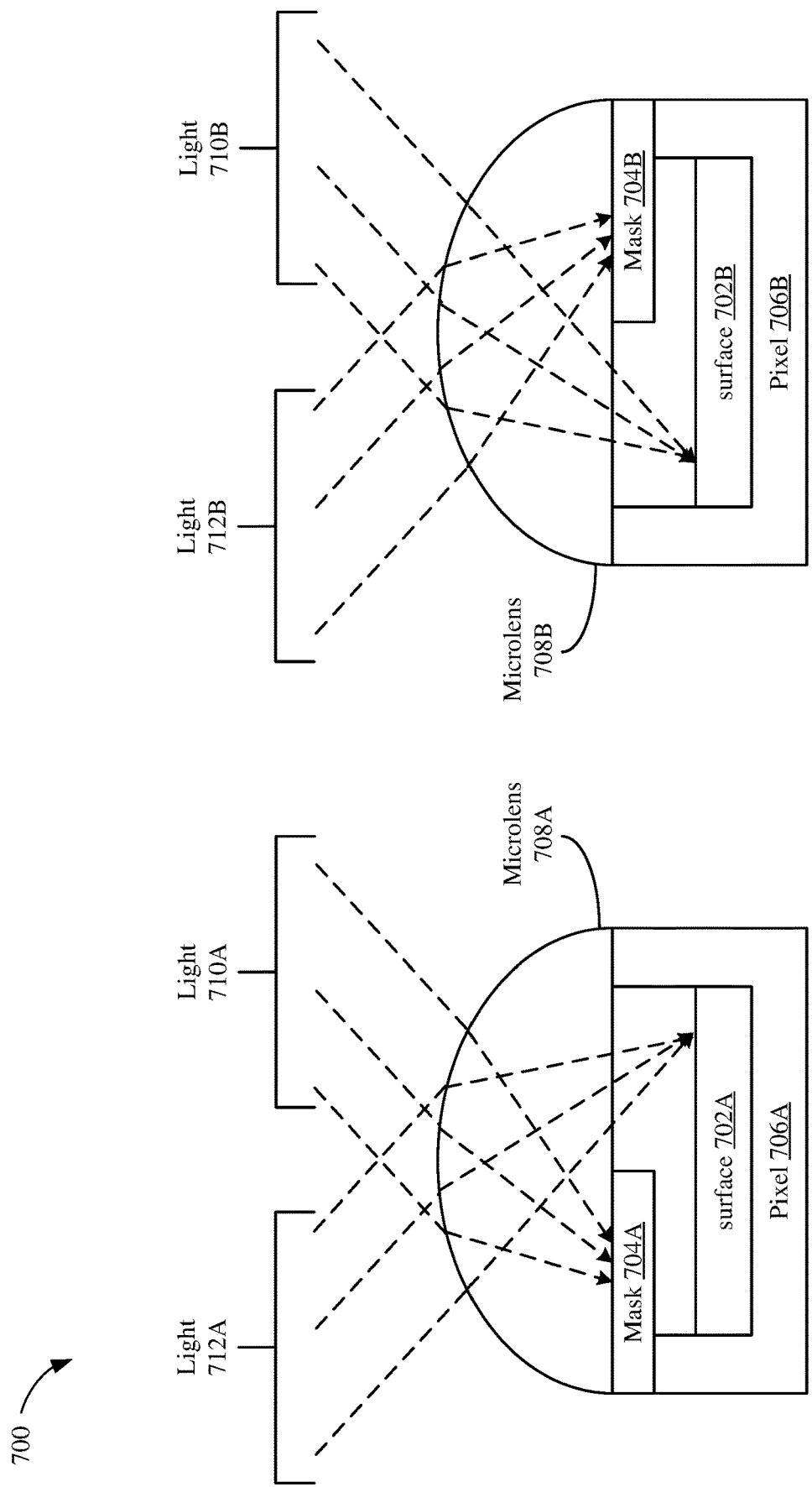
FIG. 7A is a depiction of an example phase detection pixel pair configured to capture image data from different perspectives in performing pixel-level phase detection.

FIG. 7A is a depiction of an example PD pair 700 configured to capture image data from different perspectives through the use of masks. The PD pair 700 includes PD pixel 706A including a photosensitive surface 702A and PD pixel 706B including a photosensitive surface 702B. The PD pixel 706A is coupled to a microlens 708A to direct light to the surface 702A, and the PD pixel 706B is coupled to a microlens 708B to direct light to the surface 702B. The pixel 706A includes a mask 704A occluding a portion of the surface 702A, and the pixel 706B includes a mask 704B occluding a portion of the surface 702B. As shown, the mask 704A and the mask 704B occlude different portions of the respective surface 702A and the surface 702B to configure the pixels 706A and 706B to capture image data from different perspectives.

For example, light 710A from a first perspective may be directed by the microlens 708A toward the surface 702A of the pixel 706A. However, the mask 704A coupled to the pixel 706A may block the light 710A from reaching the surface 702A. Referring to the pixel 706B, light 710B from the first perspective may be directed by the microlens 708B to the surface 702B (which is not blocked by the mask 704B). Referring to the pixel 706A, light 712A from a second perspective may be directed by the microlens 708A to the surface 702A (which is not blocked by the mask 704A). In contrast, light 712B from the second perspective may be directed by the microlens 708B toward the surface 702B of the pixel 706B, but the mask 704B blocks the light 712B from reaching the surface 702B. In this manner, the pixel 706A may be configured to capture image data from the first perspective, and the pixel 706B may be configured to capture image data from the second perspective.

Figure 7B:
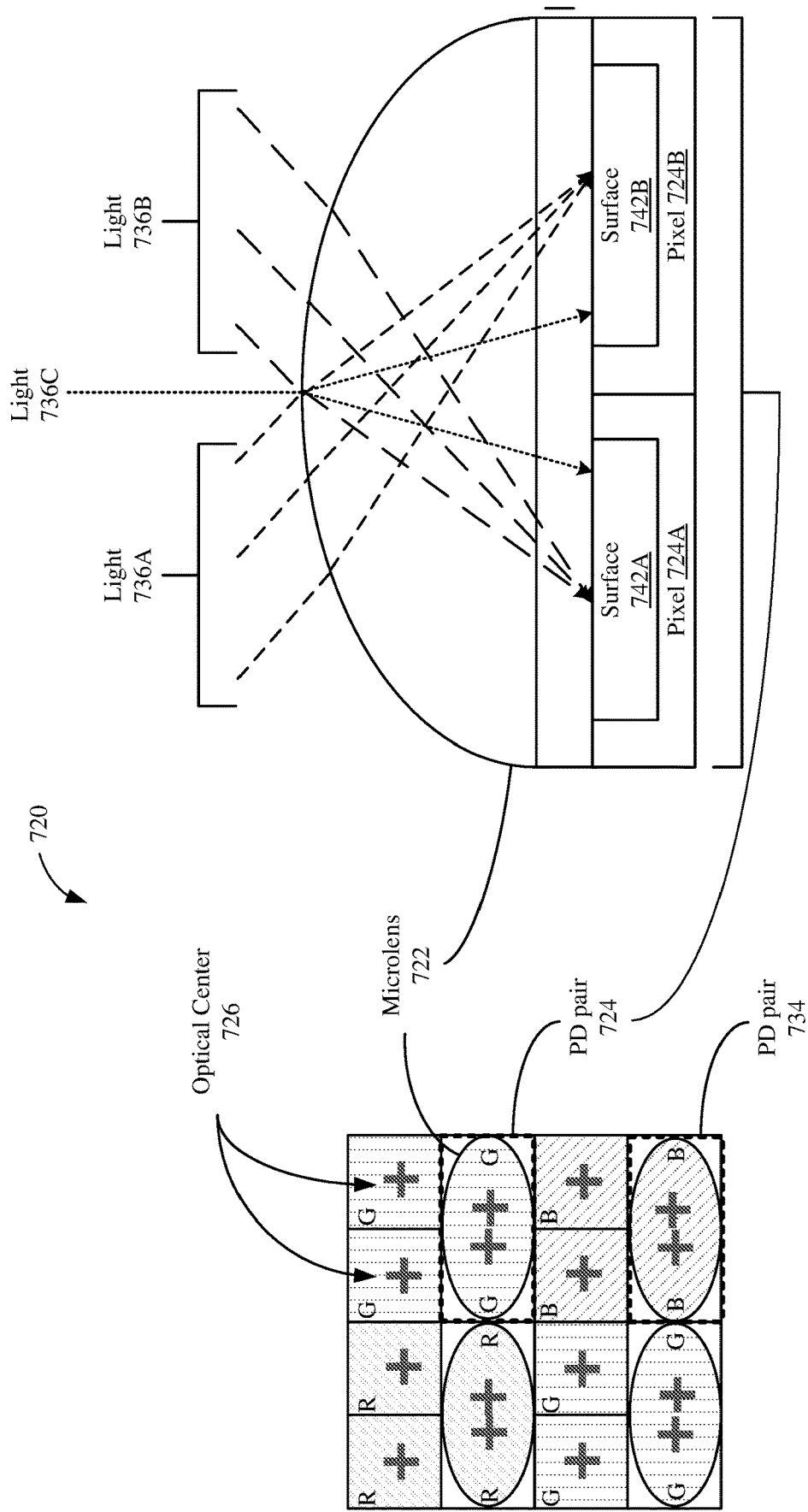
FIG. 7B is a depiction of a portion of an image sensor with phase detection pixels sharing a microlens configured for pixel-level phase detection.

In some other implementations, a microlens shared by the pixels of a PD pair may be used to configure the PD pixels to capture image data from different perspectives. FIG. 7B is a depiction of a 4 pixel by 4 pixel (4×4) tile 720 of a camera sensor. The tile 720 is depicted as coupled to a portion of a CFA (with the colors of the filters indicated by R for red color filter, B for blue color filter, and G for green color filter). Additionally, a plurality of the pixels of the tile 720 may be coupled to separate microlenses to direct light to the photosensitive surface of the corresponding pixel.

However, some of the pixels of the tile share a microlens (such as shared microlens 722), and characteristics of the shared microlens may be used to configure the pixels as PD pixels. In this manner, the PD pairs (such as PD pairs 724 and 734) are coupled to or include a shared microlens (such as shared microlens 722). Design imperfections in the microlenses may cause the optical centers 726 (where light hits the pixel surface when an object is in focus) to be different than the physical center of each microlens. For example, the optical center 726 for each pixel in the tile 720 is indicated as a plus. While, theoretically, the optical center for a PD pair should be the physical center of the PD pair and shared microlens, the imperfections in the microlens may cause an offset of the optical centers for each PD pixel of the PD pair. In this manner, the optical center from the perspective of a left PD pixel may be on the surface of the left PD pixel, and the optical center from the perspective of a right PD pixel may be on the surface of the right PD pixel. For example, the optical center from the perspective of the left pixel of the PD pair 724 is separated from the optical center from the perspective of the right pixel of the PD pixel pair 724. As a result, there exists resolution separation between the left PD pixels and right PD pixels of PD pairs, and the resolution separation may be used for PD.

For example, the PD pixels 724A and 724B of the PD pair 724 may share a microlens 722 to direct light to the surfaces 742A and 742B of the PD pixels 724A and 724B, respectively. Light 736A from a first perspective may be directed by the microlens 722 to the surface 742B. Light 736B from a second perspective may be directed by the microlens 722 to the surface 742A. Portions of the light 736C may be directed by the microlens 722 to the surface 742A and the surface 742B. In this manner, the surfaces 742A and 742B receive light from a range of directions associated with a circle of confusion for the pixels.

As a result, captured image data from a first perspective by a first subset of PD pixels may be used to generate a first perspective image, and captured image data from a second perspective by a second subset of PD pixels may be used to generate a second perspective image. A device may compare the images to determine phase differences.

While the pixels of the tile 720 are depicted as being coupled to R, G, or B color filters, the PD pixels may be coupled to clear color filters (which may be referred to as a C pixel), may be configured to receive IR light (which may be referred to as an IR pixel), or may be coupled to another suitable filter (or no filter). For example, a clear color filter or no color filter may be used to allow more light to reach the PD pixel surfaces. However, as shown, PD pixels may include color filters for capturing image data for color imaging as well as for PD. For example, pairs of R pixels, pairs of G pixels, or pairs of B pixels may share a microlens and be used for PD. PD pair 724 is depicted as including two G pixels. PD pair 734 is depicted as including two B pixels.

As noted, a first subset of pixels of the camera sensor may be PD pixels configured to capture image data from the first perspective (e.g., a left perspective), and a second subset of pixels of the camera sensor may be PD pixels configured to capture image data from the second perspective (e.g., a right perspective). In some implementations, the camera sensor may also include PD pairs configured to capture image data from perspectives 90 degrees with respect to the first perspective and the second perspective (e.g., top and bottom perspectives). While the microlenses in the previous examples are illustrated as U-shaped, a shared microlens may be of any suitable shape.

As noted above, the number of PD pixels compared to the total number of pixels in some image sensor pixel configurations may be approximately three percent. Errors in detecting phases may be caused by the sparseness of PD pixels in the image sensor. In some other implementations, the image sensor may be configured so that each pixel of the image sensor may be used for PDAF. For example, the image sensor may be a dual pixel (2PD) sensor where each pixel includes two photodiodes associated with different sensing surfaces of each pixel. In this manner, every pixel of the 2PD sensor may be used for PD.

While 2PD image sensors increase the accuracy of PD (such as for PDAF), 2PD image sensors are more expensive and difficult to manufacture than other image sensors. For example, 2PD image sensors require at least two photodiodes and photosensitive surfaces per pixel, which become more difficult and expensive to manufacture as the size of the pixels decreases.

While PD is described above with respect to PDAF, PD may be used for other depth related image processing functions (e.g., generating depth maps, including bokeh-effects in generated images, etc.). For example, a depth map may be generated from the captured image data from different perspectives. The depth map may include estimates of distances of objects from the first image sensor, and the distances may be based on the disparity between measurements by the first pixels and the second pixels of the PD pixel pairs. The disparities may correspond to the difference in perspective between the measurements from the first focus pixels and the measurements from the second focus pixels. In some implementations, a sum of absolute differences (SAD) metric may be used for determining the disparity.

As noted above, sensor pixels may be coupled to color filters for color imaging. An image sensor of the camera 102 may include or be coupled to a color filter array (CFA) including a plurality of color filters. A CFA is an array of color filters associated with predefined colors. For example, a CFA may include a pattern of red color filters, green color filters, and blue color filters. Each sensor pixel may sense either light in the red color spectrum, light in the green color spectrum, or light in the blue color spectrum based on the color filter coupled to the sensor pixel. One pattern of color filters of a CFA is a Bayer pattern. A Bayer pattern alternates lines of (i) alternating red color filters and green color filters and (ii) alternating blue color filters and green color filters.

Figure 8:
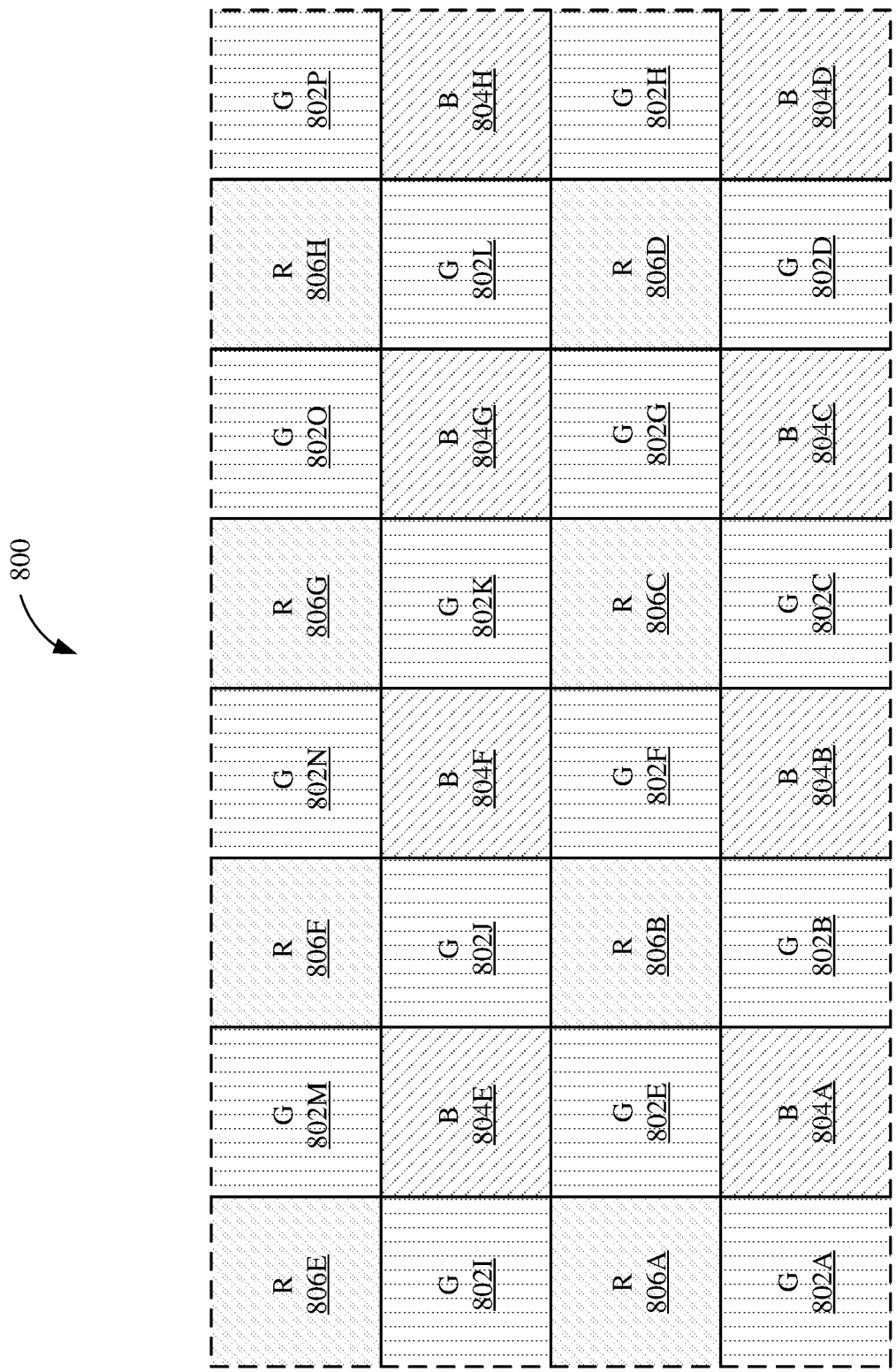
FIG. 8 is a depiction of a portion of a Bayer color filter array.

FIG. 8 is a depiction of a portion of a Bayer CFA 800. In some implementations, a camera may include the Bayer CFA 800 coupled to the image sensor. The Bayer CFA 800 includes a green color filter for every other pixel of the image sensor (e.g., green color filters 802A-802P). Every other row includes a blue color filter between green color filters in the row (e.g., blue color filters 804A-804H), and the other rows include a red color filter between green color filters in the row (e.g., red color filters 806A-806H). A Bayer CFA is an example CFA with a 2×2 pixel repeating pattern for an image sensor for color imaging. An image sensor coupled to a CFA may be referred to as a CFA image sensor. For example, an image sensor coupled to a Bayer CFA may be referred to as a Bayer CFA image sensor. An image sensor coupled to a quad CFA may be referred to as a quad CFA image sensor. Descriptions and illustrations refer to an image sensor pixel coupled to a red color filter as R, to an image sensor pixel coupled to a blue color filter as B, and to an image sensor pixel coupled to a green color filter as G.

The camera 102 may include a quad CFA (QCFA) image sensor used in generating, e.g., an image with a resolution equal to the number of pixels of the QCFA image sensor in non-low light environments (such as for daytime scenes or scenes with a threshold amount of ambient light). The QCFA image sensor may also be used in generating lower resolution images in low light environments (such as for scenes without a threshold amount of ambient light). In non-low light environments, the QCFA image sensor may be used to produce color images with the number of image pixels equal to the number of image sensor pixels using a first demosaicing algorithm. For example, the device 100 may receive captured image data from a 48-megapixel image sensor corresponding to a QCFA mosaic and produce a 48 million pixel resolution image based on the first demosaicing algorithm. A demosaicing algorithm may refer to digital image process used to construct a full color image from incomplete color samples output from a CFA image sensor. Demosaicing may also be referred to as CFA interpolation or color reconstruction. In some implementations, the image signal processor 112 may perform demosaicing during processing of the captured image data to generate an image, and the device 100 may adjust the demosaicing to be performed based on the demosaicing algorithm to be applied.

In low light environments, a second demosaicing algorithm may be applied to captured image data by the image signal processor 112. The second demosaicing algorithm may include combining measurements from neighboring sensor pixels to increase the contrast in luminance (e.g., remosaicing). For example, a QCFA mosaic may be remosaiced to a CFA mosaic, which may have combined color values from the QCFA mosaic to generate color values of the CFA mosaic. In this manner, the device 100 may apply the second demosaicing algorithm to generate a lower resolution color image with better contrast than if applying the first demosaicing algorithm.

Figure 9:
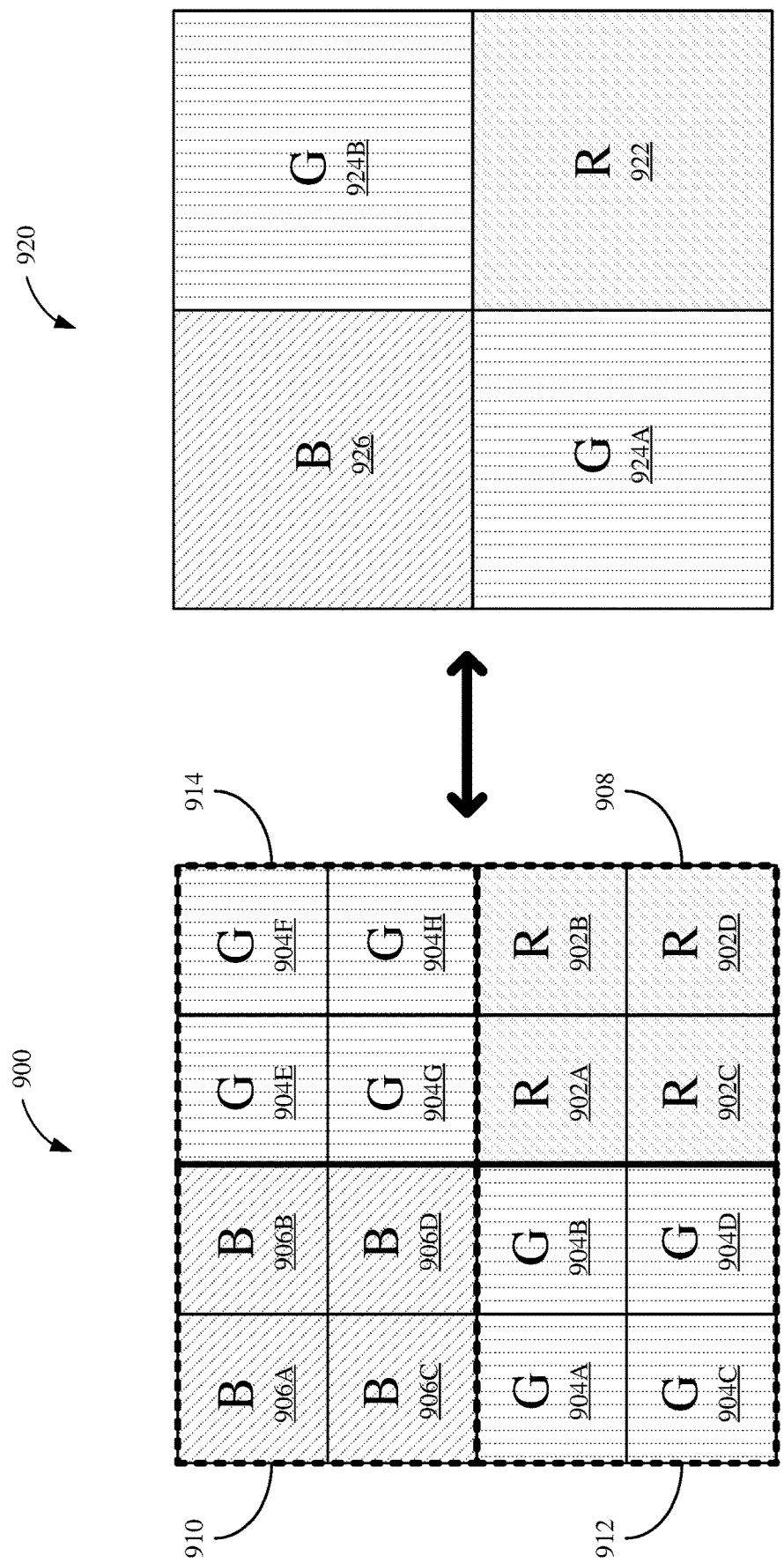
FIG. 9 is a depiction of a 4×4 pixel pattern of a Quad Bayer CFA image sensor.

FIG. 9 is a depiction of a 4×4 pixel pattern 900 of a Quad Bayer CFA image sensor, which is an example implementation of a QCFA image sensor. The Quad Bayer CFA image sensor may include 2×2 blocks (or quads) of pixels having color filters of the same color. For example, block 908 may include four R pixels 902A-902D, block 910 may include four B pixels 906A-906D, block 912 may include four G pixels 904A-904D, and block 914 may include four G pixels 904E-904H. Each block 908-914 may also be referred to as a pixel cluster.

Each sensor pixel of the Quad Bayer CFA image sensor pixel in a given pixel cluster may be concurrently exposed for a rolling shutter. With concurrent exposure, each sensor pixel in a given pixel cluster can begin exposure at the same point in time and/or end exposure at the same point in time. Ending the exposure of the sensor pixels in a pixel cluster at the same time may enable the device 100 to concurrently read out the photometrics from each sensor pixel of a pixel cluster. For non-low light environments, individual photometrics may be used to determine individual pixel colors of an image to construct an image with the same number of image pixels as sensor pixels. For low light environments, sensor pixels of a pixel cluster may be remosaiced (such as binned) such that the photometrics for multiple sensor pixels are combined (as illustrated by pattern 920 in FIG. 9). For example, B pixels 906A-906B may be binned to be equivalent to a larger B pixel 926, R pixels 902A-902D may be binned to be equivalent to a larger R pixel 922, G pixels 904A-904D may be binned to be equivalent to a larger G pixel 924A, and G pixels 904E-904H may be binned to be equivalent to a larger G pixel 924B. As shown, the pattern 920 is a Bayer CFA pattern (such as illustrated in FIG. 8).

In this manner, captured image data from an image sensor including pixels arranged in the sensor pixel pattern 900 may be used to generate images corresponding to one to one mappings of the image pixels and sensor pixels (referred to as a Quad Bayer image mosaic), or the captured image data may be mosaiced to generate images corresponding to one to four mappings of the image pixels and the sensor pixels of the sensor pixel pattern 920 (referred to as a Bayer image mosaic). During an example conversion from a Quad Bayer image mosaic to a Bayer image mosaic, the values associated with the pixels of a pixel cluster are summed and divided by the number of summed values (e.g., four) to yield an averaged value. The averaged value may be used as the value of the corresponding pixel of the Bayer image mosaic. To note, merging values from four image pixels may cause a 75 percent resolution loss. In some implementations of mosaicing, the original pixel values may be the analog photometrics after digital conversion. In some other implementations, the original pixel values may be the analog photometrics after digital conversion plus additional post-processing (e.g., color balancing).

Figure 10:
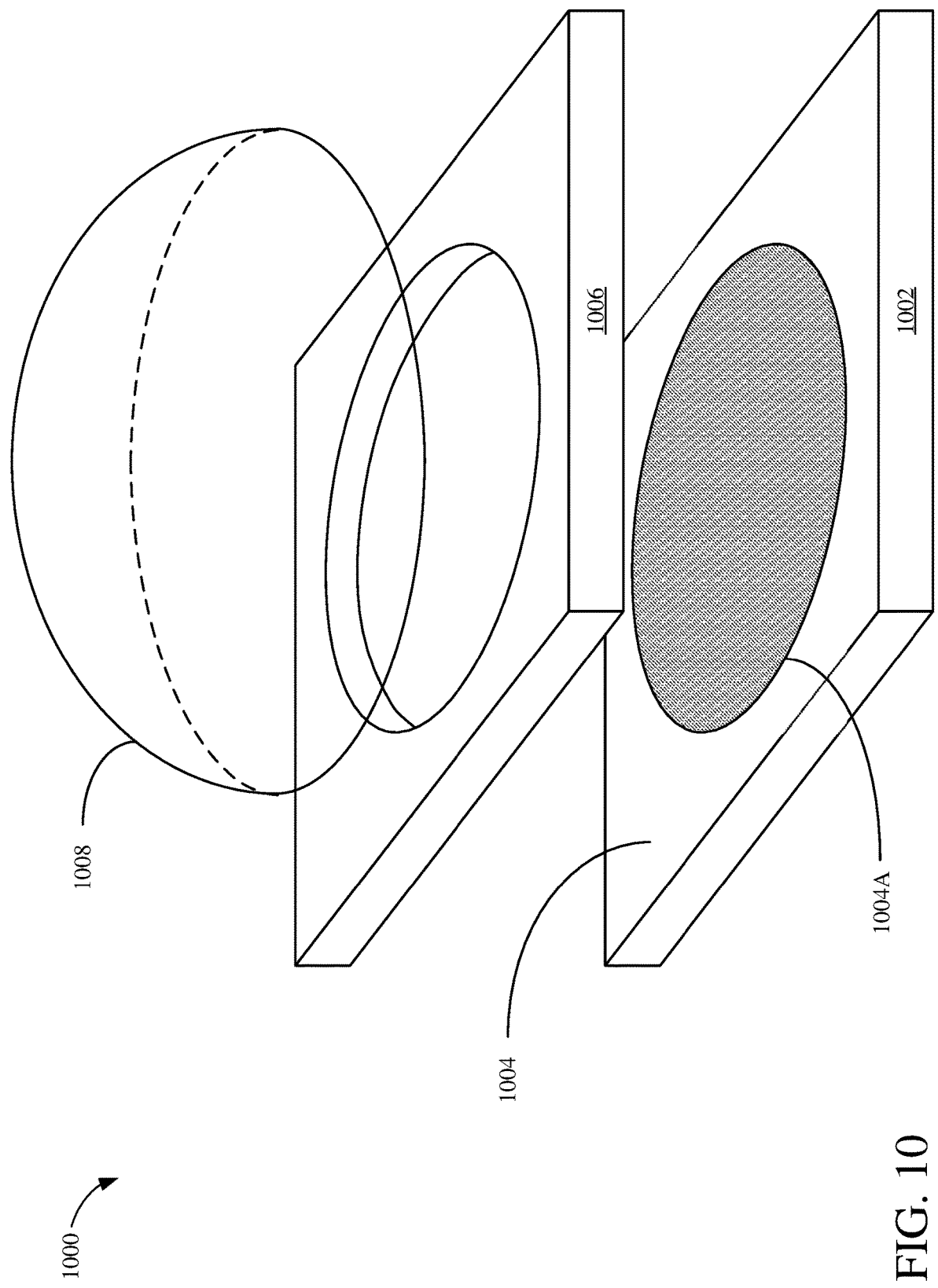
FIG. 10 is a depiction of a pixel-based aperture.

Referring back to pixel-level aperture simulation, pixel-level aperture simulation may be performed using masks with pixel-level apertures coupled to a plurality of pixels of an image sensor. FIG. 10 is a depiction of an exploded view 1000 of a pixel 1002 coupled to a mask 1006 and a microlens 1008. While not shown, the pixel 1002 may also be coupled to a color filter. The microlens 1008 may be configured to direct light toward the surface 1004 of the pixel 1002. However, the aperture of the mask 1006 may restrict the area of the surface 1004 receiving light to region 1004A. The aperture of the mask 1006 may be any suitable size. Additionally, an image sensor may include pixels coupled to different aperture size masks. For example, referring back to FIG. 7B, the non-PD pixels in the pixel pattern of tile 720 may be coupled to different aperture size masks. For example, one non-PD pixel from each 2×2 quad may be coupled to a pixel-level mask having a first size aperture, and the other non-PD pixel from each 2×2 quad may be coupled to a pixel-level mask having a second size aperture.

If the camera 102 image sensor is configured to include a first subset of pixels coupled to masks having a first size aperture and a second subset of pixels coupled to masks having a second size aperture, the device 100 may be configured to perform aperture simulation based on the different size apertures among the pixels. In this manner, each sensor pixel may be configured to include one photodiode. In some implementations, the camera 102 image sensor may also include an array of sensor pixels coupled to a quad Bayer CFA. In this manner, the image sensor may be configured for color imaging (including HDR imaging).

Figure 11:
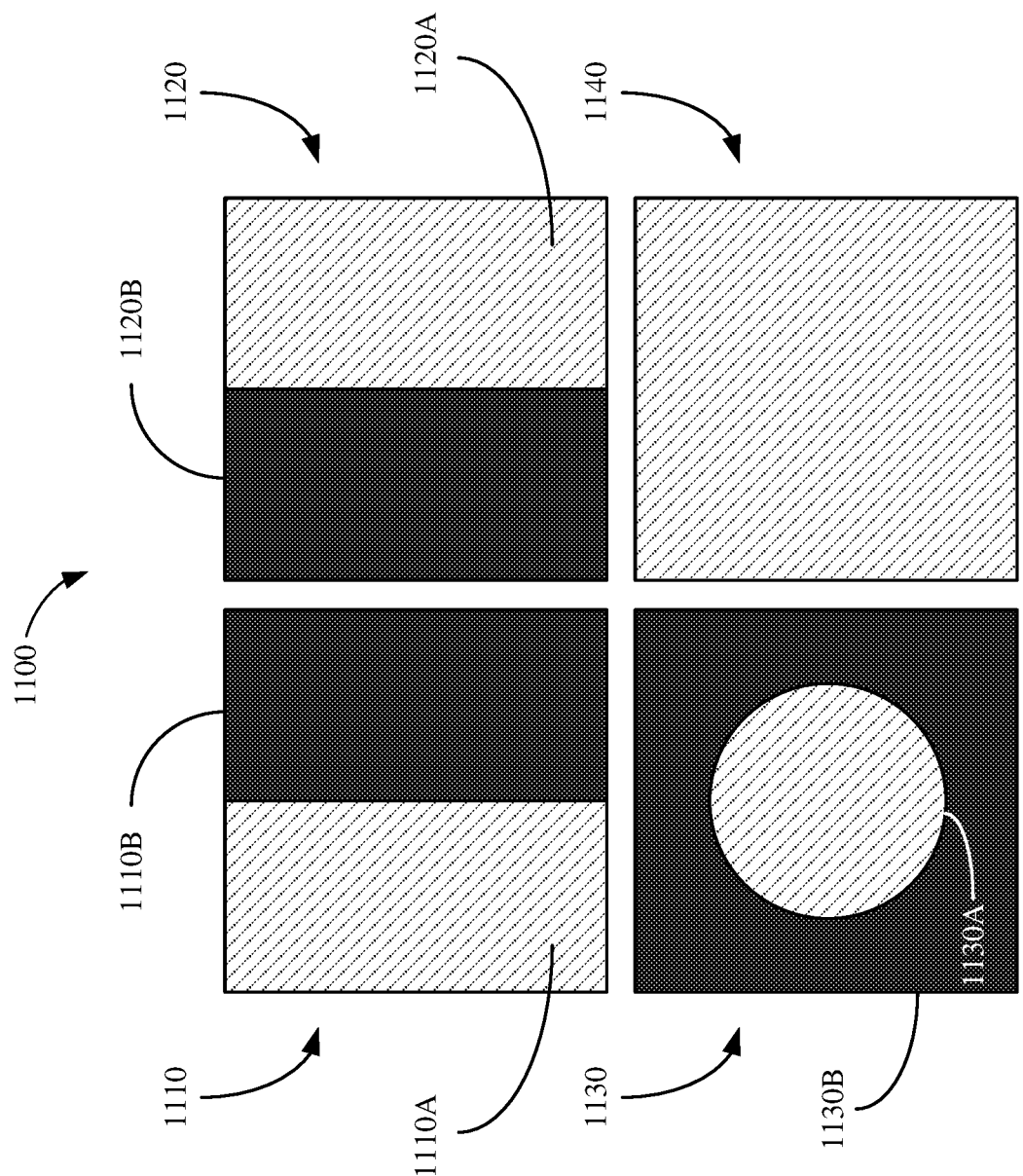
FIG. 11 is a depiction of an example configuration of a 2×2 pixel patch of an image sensor.

FIG. 11 is a depiction of an example configuration of a quad 1100. The quad 1100 may be associated with three different size exposure regions among the pixels 1110-1140.

The quad includes a first pixel 1110, a second pixel 1120, a third pixel 1130, and a fourth pixel 1140. In some implementations, the first pixel 1110 and the second pixel 1120 may be configured using masks 1110B and 1120B, respectively, to capture image data from two different perspectives. For example, if the quad 1100 is oriented as shown, the first pixel 1110 and the second pixel 1120 may capture image data from a right perspective and a left perspective, respectively.

The depiction is from a top-down perspective of the pixels 1110-1140. The pixel 1110 includes or is coupled to the mask or shield 1110B that occludes a portion of the surface of the pixel 1110. In this manner, the portion 1110A of the photosensitive surface of the pixel 1110 is configured to receive light for capturing image data from a first perspective (such as the right perspective). Similarly, pixel 1120 includes or is coupled to the mask or shield 1120B that occludes a portion of the surface of the pixel 1120. In this manner, the portion 1120A of the photosensitive surface of the pixel 1120 is configured to receive light for capturing image data from a second perspective (such as the left perspective). In some implementations, the pixel 1110 and the pixel 1120 are PD pixels of a PD pixel pair.

The pixel 1130 includes or is coupled to a mask or shield 1130B that occludes a portion of the surface of the pixel 1130. In this manner, the portion 1130A of the photosensitive surface of the pixel 1130 is configured to receive light for capturing image data. The pixel 1140 is not coupled to (or does not include) a mask that occludes a portion of the pixel surface. In some other implementations, the pixel 1140 may be coupled to or include a mask with a different size aperture than the mask 1130B for the pixel 1130. In the depiction, an aperture size corresponding to the pixel 1130 may be considered smaller than an aperture size corresponding to the pixel 1140 since the photosensitive surface 1130A is smaller than the pixel 1140 configured to receive light.

The device 100 may be configured to perform aperture simulation by combining the image values from the different pixels 1110-1140. For example, the IV for the pixel 1130 and the IV for the pixel 1140 may be combined to generate an IV associated with a larger size aperture pixel than pixel 1130 (similar to equations (1) and (2)). Additionally, in some implementations, the device may combine the IV for the pixel 1110 with the IV for the pixel 1120 to generate an IV similar to the IV for the pixel 1140. If the pixel 1140 includes a mask with an aperture greater in size than the aperture for mask 1130B, combining the IVs from the pixels 1110 and 1120 may be associated with a first exposure region (with the largest size aperture), the IV from the pixel 1140 may be associated with a second exposure region (with the next largest size aperture), and the IV from the pixel 1130 may be associated with a third exposure region (with the smallest size aperture). In this manner, the device 100 may process the captured image values from each quad to associate a frame of captured image values with at least three exposure regions (corresponding to different pixel-level aperture sizes).

As noted above, a camera's focal ratio (also referred to as an f-stop) corresponds to a camera's field of view, magnification level, and light intensity measured. An f-stop may be based on the camera's focal length and aperture size, e.g., as defined by equation (3) below:

An f-stop equal to one may mean that the focal length distance equals the size of the aperture in the mask. An f-stop equal to two may mean that the focal length distance is twice the size of the aperture in the mask.

In an example regarding the quad 1100 depicted in FIG. 11, the image pixel 1130 may be configured to have an f-stop of 2.8. Furthermore, the aperture size of the pixel 1140 (which does not include a mask) may be considered the width of the photosensitive surface of the pixel 1140. Continuing the above example, the pixel 1140 may have an f-stop of 2.0. If the focal length for the camera is the same across the pixels of the image sensor, the f-stop may indicate the size of the aperture for the corresponding pixel. For example, assuming the focal length for the pixel 1130 and the focal length for the pixel 1140 are the same, the aperture size of the pixel 1140 is 1.4 times the aperture size of the pixel 1130. While the example describes pixels 1130 and 1140 having respective focal ratios of 2.8 and 2.0, any suitable focal ratios may be used. As shown, the pixels 1110-1140 are configured to provide PD functionality and aperture simulation (AS) functionality. Combined PD functionality and AS functionality may be referred to as PDAS functionality.

Figure 12A:
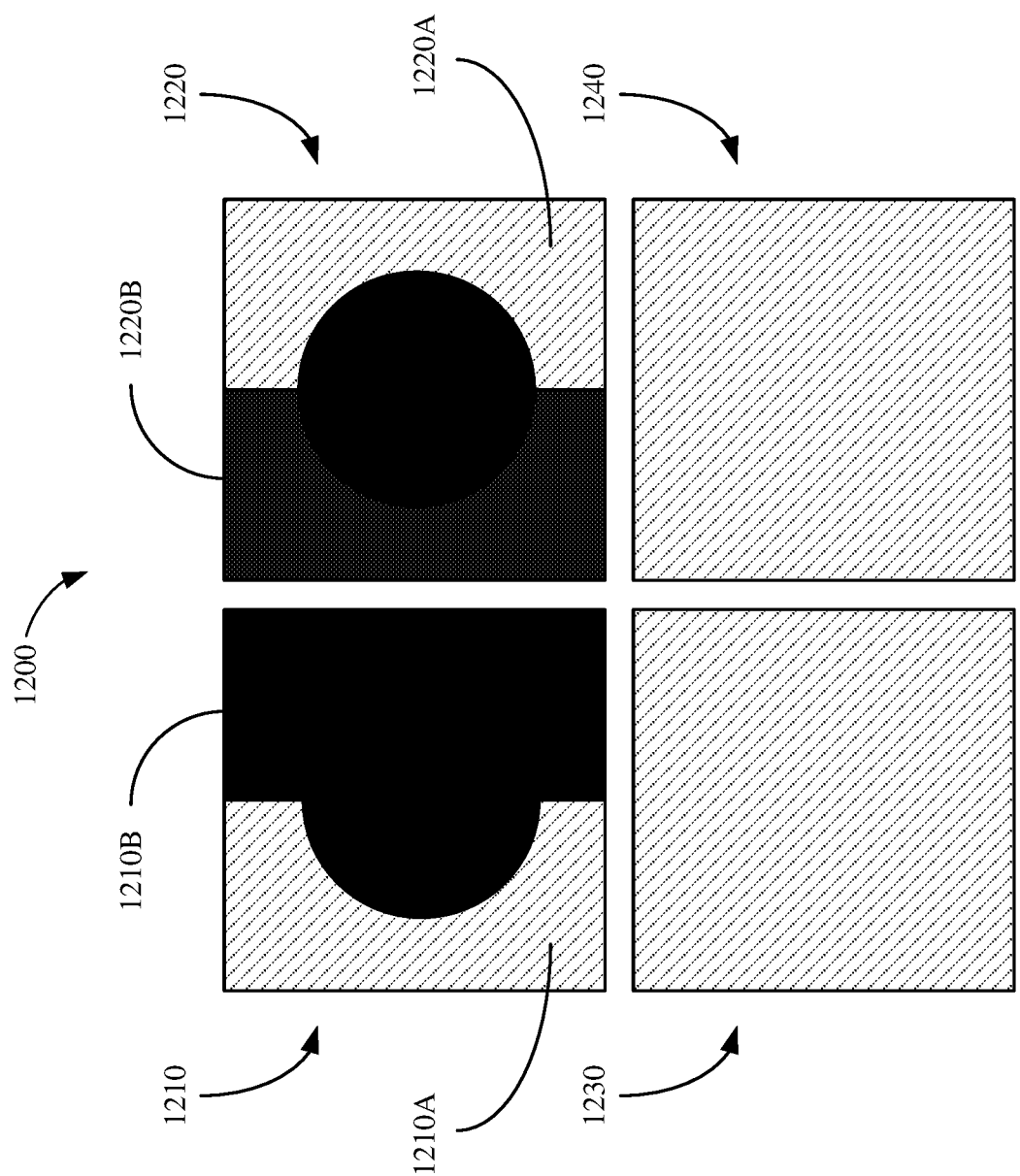
FIG. 12A is a depiction of another example configuration of a 2×2 pixel patch of an image sensor.

FIG. 12A is a depiction of another example configuration of a quad 1200. The quad 1200 may include a first pixel 1210, a second pixel 1220, a third pixel 1230 and a fourth pixel 1240. Similar to FIG. 11, the pixel 1210 and the pixel 1220 may include masks 1210B and 1220B, respectively, for occluding portions of the pixel surfaces to configure the pixels 1210 and 1220 to capture image data from a first perspective and a second perspective. The pixel 1210 may include a photosensitive surface 1210A for receiving light corresponding to captured image data from a first perspective, and the pixel 1220 may include a photosensitive surface 1220A for receiving light corresponding to captured image data from a second perspective. The pixels 1230 and 1240 may not include a mask or otherwise incorporate shielding. In some other example implementations, the pixel 1230 and/or the pixel 1240 may include or be coupled to a mask having a fixed sized aperture.

The masks 1210B and 1220B may be shaped for the device 100 to determine exposure regions differently than for the quad 1100 in FIG. 11. Referring back to FIG. 11, the device 100 may combine IVs for the different pixels to associate pixels 1110 and 1120 with a first exposure region, pixel 1140 with a second exposure region, and pixel 1130 with a third exposure region. Other exposure regions may be logically generated by combining IVs from different pixels of the quad 1100. Referring to FIG. 12A, the device 100 may combine the image values from the pixel 1210 (having the photosensitive surface 1210A) and the image values from the pixel 1220 (having the photosensitive surface 1220A) to simulate, e.g., a photosensitive surface similar to the outer photosensitive surface 404 of the pixel 400 in FIG. 4 or a photosensitive surface similar to the surface of the pixel 1130 occluded by the mask 1130B in FIG. 11. The device 100 may therefore use the image values from the pixels 1230 and 1240 to simulate capturing image data using a mask similar to mask 1130B in FIG. 11.

An example calculation in determining an image value for such a simulated pixel including a mask with such an aperture size is provided in equation (4) below:

$$f\text{-stop} = \frac{\text{focal length distance}}{\text{aperture size}} \quad (3)$$

$$IV_{simulated\ pixel} = \frac{(IV_{pixel\ 1230} + IV_{pixel\ 1240})}{2} - (IV_{pixel\ 1210} + IV_{pixel\ 1220}) \quad (4)$$

Note that while the above equation (4) averages $IV_{pixel\ 1230}$ and $IV_{pixel\ 1240}$, in some other implementations, one of the two pixel values $IV_{pixel\ 1230}$ and $IV_{pixel\ 1240}$ may be used exclusively for calculating $IV_{simulated\ pixel}$. For example, determining the image value of the simulated pixel may be as defined in equation (5) below:

$$IV_{simulated\ pixel} = (IV_{pixel\ 1230}\ or\ IV_{pixel\ 1240}) - (IV_{pixel\ 1210} + IV_{pixel\ 1220}) \quad (5)$$

In some example implementations, the device 100 may associate $IV_{pixel\ 1210} + IV_{pixel\ 1220}$ with a first exposure region, $IV_{simulated\ pixel}$ with a second exposure region, and $IV_{pixel\ 1230}$ or $IV_{pixel\ 1240}$ (or the average of the two) with a third exposure region corresponding to different aperture sizes.

Figure 12B:
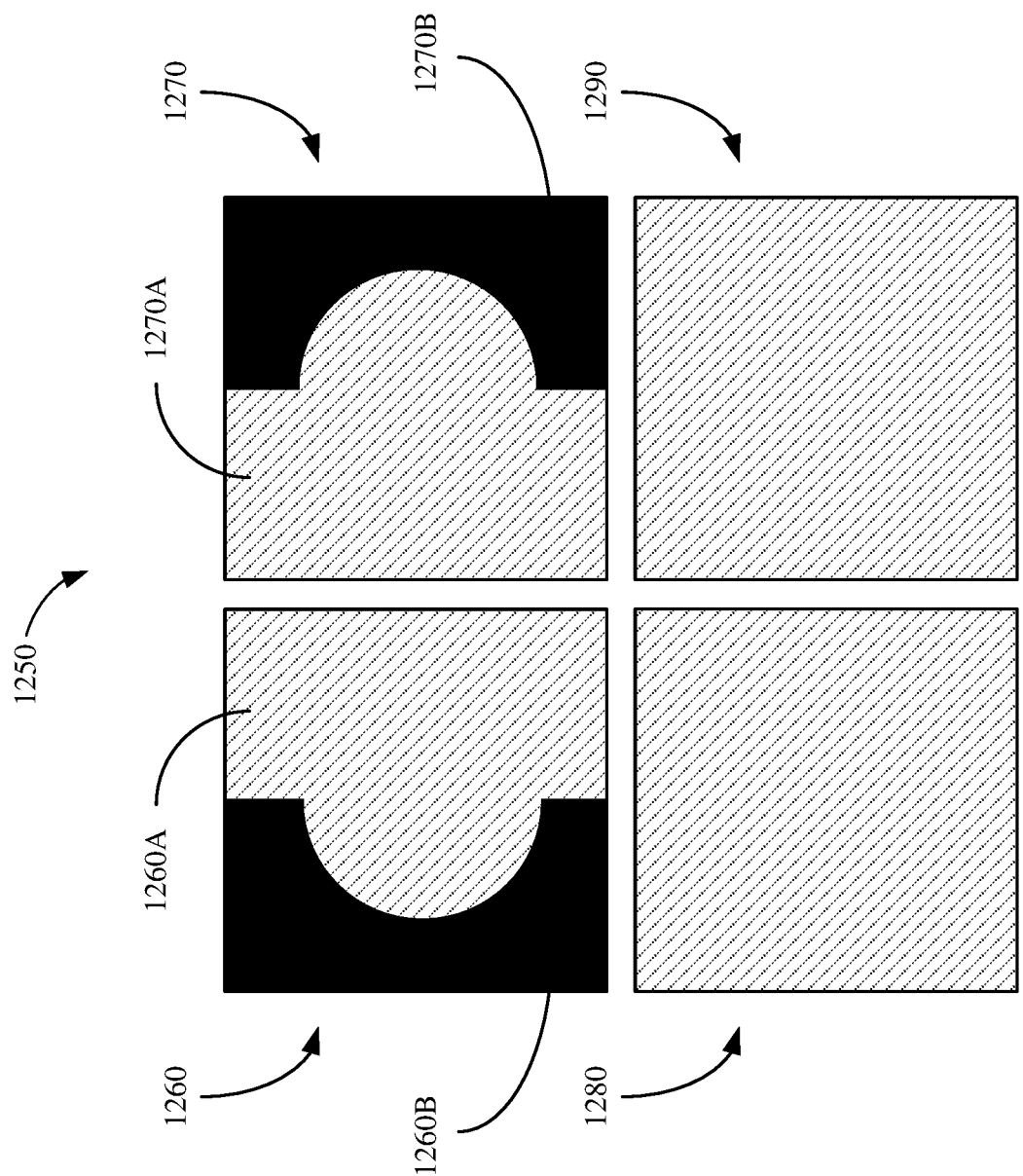
FIG. 12B is a depiction of another example configuration of a 2×2 pixel patch of an image sensor.

FIG. 12B is a depiction of another example configuration of a quad 1250. The quad 1250 may include a first pixel 1260, a second pixel 1270, a third pixel 1280 and a fourth pixel 1290. Similar to FIG. 12A, the pixel 1260 and the pixel 1270 may include or be coupled to masks 1260B and 1270B, respectively, for occluding portions of the pixel surfaces to configure the pixels 1260 and 1270 to capture image data from first and second perspectives. Also similar to FIG. 12A, the pixels 1280 and 1290 may not include a mask or otherwise incorporate shielding.

In contrast to FIG. 12A, the masks 1260B and 1270B occlude the portions of the pixel surfaces similar to portions of photosensitive surfaces 1210A and 1220A. In this manner, the masks 1260B and 1270B are shaped such that the pixel 1260 includes photosensitive surface 1260A to receive light from a first perspective and pixel 1270 includes photosensitive surface 1270A to receive light from a second perspective. In the implementation, the perspectives of the PD pixels 1260 and 1270 are switched as compared to the PD pixels 1210 and 1220 in FIG. 12A. Additionally, the device 100 may use the image values from the pixels 1260-1290 to simulate capturing image data using a mask similar to mask 1130B in FIG. 11, but in a different manner than equations (4) and (5).

An example calculation in determining an image value for a simulated pixel including a mask with such an aperture size is provided in equation (6) below:

$$IV_{simulated\ pixel} = (IV_{pixel\ 1260} + IV_{pixel\ 1270}) - \frac{(IV_{pixel\ 1280} + IV_{pixel\ 1290})}{2} \quad (6)$$

Note that while the above equation (6) averages $IV_{pixel\ 1280}$ and $IV_{pixel\ 1290}$, in some other implementations, one of the two values may be used exclusively for calculating $IV_{simulated\ pixel}$. For example, determining the image value of the simulated pixel may be as defined in equation (7) below:

$$IV_{simulated\ pixel} = (IV_{pixel\ 1260} + IV_{pixel\ 1270}) - (IV_{pixel\ 1280}\ or\ IV_{pixel\ 1290}) \quad (7)$$

As shown in FIGS. 11-12B, masks or shielding may be used to configure pixels as PD pixels. In some implementations, using a mask or shielding to configure pixels for PD functionality may reduce the values of the intensity sensings from the PD pixels, as portions of the pixel surfaces may be occluded by the mask. In some other implementations of PD pixels, an OCL (such as a microlens) may be used to configure pixels for PD functionality (such as described above with respect to FIG. 7B).

Figure 13B:
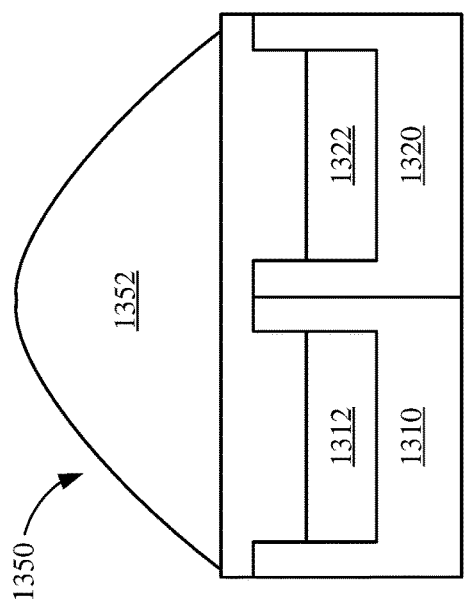
FIG. 13B is a depiction of a cross-sectional perspective of the phase detection pixels from the configuration in FIG. 13A.
Figure 13C:
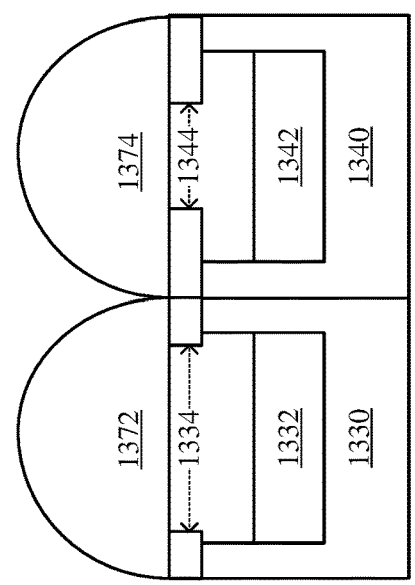
FIG. 13C is a depiction of a cross-sectional perspective of the non-phase detection pixels from the configuration in FIG. 13A.
Figure 13A:
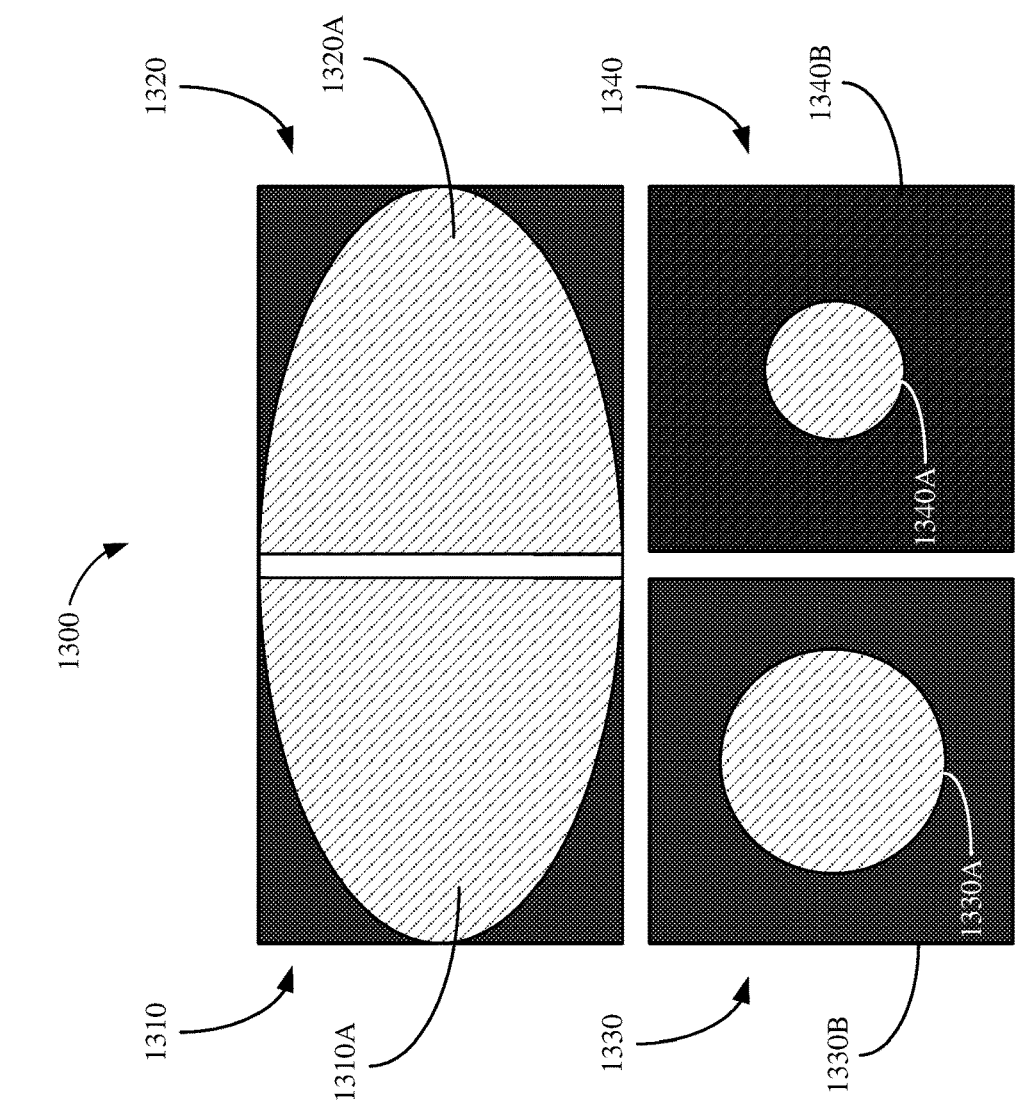
FIG. 13A is a depiction of an example configuration of a 2×2 pixel patch for aperture simulation.

FIG. 13A is a depiction of another example configuration of a quad 1300. The quad 1300 may include a first pixel 1310, a second pixel 1320, a third pixel 1330, and a fourth pixel 1340. Similar to FIGS. 11, 12A, and 12B, the pixel 1310 and pixel 1320 may capture image data from a first perspective and a second perspective. However, instead of using a shield to configure the PD pixels 1310 and 1320, the PD pixel 1310 and the PD pixel 1320 may be covered by a microlens.

FIG. 13B shows a cross-sectional perspective 1350 of the pixels 1310 and 1320 from the quad 1300 in FIG. 13A. The microlens 1352 is shared by the pixels 1310 and 1320, and the microlens 1352 directs light toward the photosensitive surfaces 1312 and 1322 of the pixels 1310 and 1320, respectively. Referring back to FIG. 13A, the microlens 1352 (FIG. 13B) may be configured to direct light to a photosensitive surface 1310A of the pixel 1310 and direct light to a photosensitive surface 1320A of the pixel 1320. While the microlens 1352 is illustrated as an arced or U-shaped lens, any suitable shape and size of lenses may be used. For example, the lens may be trapezoidal in shape, have multiple arcs, cover more than two pixels (e.g., a 4×1 microlens shared by four pixels), etc.

FIG. 13C shows a cross-sectional perspective 1370 of the pixels 1330 and 1340 from the quad 1300 in FIG. 13A. The pixel 1330 may be coupled to a mask 1330B (FIG. 13A) with an aperture 1334 for light to pass through to the portion 1330A (FIG. 13A) of the exposure surface 1332. In some other implementations, the microlens 1372 may be configured to occlude the surface 1332 of the pixel 1330 outside of the portion 1330A. The pixel 1340 may be coupled to a mask 1340B (FIG. 13A) with an aperture 1344 for light to pass through to the portion 1340A (FIG. 13A) of the exposure surface 1342. In some other implementations, the microlens 1374 may be configured to occlude the surface 1342 of the pixel 1340 outside of the exposure region/portion 1340A.

As shown in FIG. 13C, the aperture 1334 may be bigger than the aperture 1344, and the corresponding portion 1330A of the exposure surface 1332 may be bigger than the corresponding portion 1340A of the exposure surface 1342. In one example, the focal ratio of the pixel 1330 may be 2.8, and the focal ratio of the pixel 1340 may be 4.0. The device 100 may be configured to use the image values associated with different apertures and different focal ratios to perform aperture simulation. For example, the device 100 may associate the combined image values for the pixel 1310 and the pixel 1320 with a first exposure region (corresponding to a first aperture size), may associate the image value for the pixel 1330 with a second exposure region (corresponding to a second aperture size), and may associate the image value for the pixel 1340 with a third exposure region (corresponding to a third aperture size). In this manner, the quad 1300 may be associated with at least three exposure regions. While the pixel 1340 is shown as being coupled to or including a mask 1340B, in some other implementations, the pixel 1340 may not include a mask (e.g., similar to the pixel 1140 of the quad 1100 in FIG. 11).

In some implementations, the image sensor of the camera 102 may be a quad Bayer image sensor including 2×2 tiles of quads configured for PDAS functionality. For example, a quad Bayer image sensor may include a tile of quads 1300 (FIG. 13A) coupled to color filters of the quad Bayer CFA (e.g., quad 1300 including four R pixels, B pixels, or G pixels).

Figure 14:
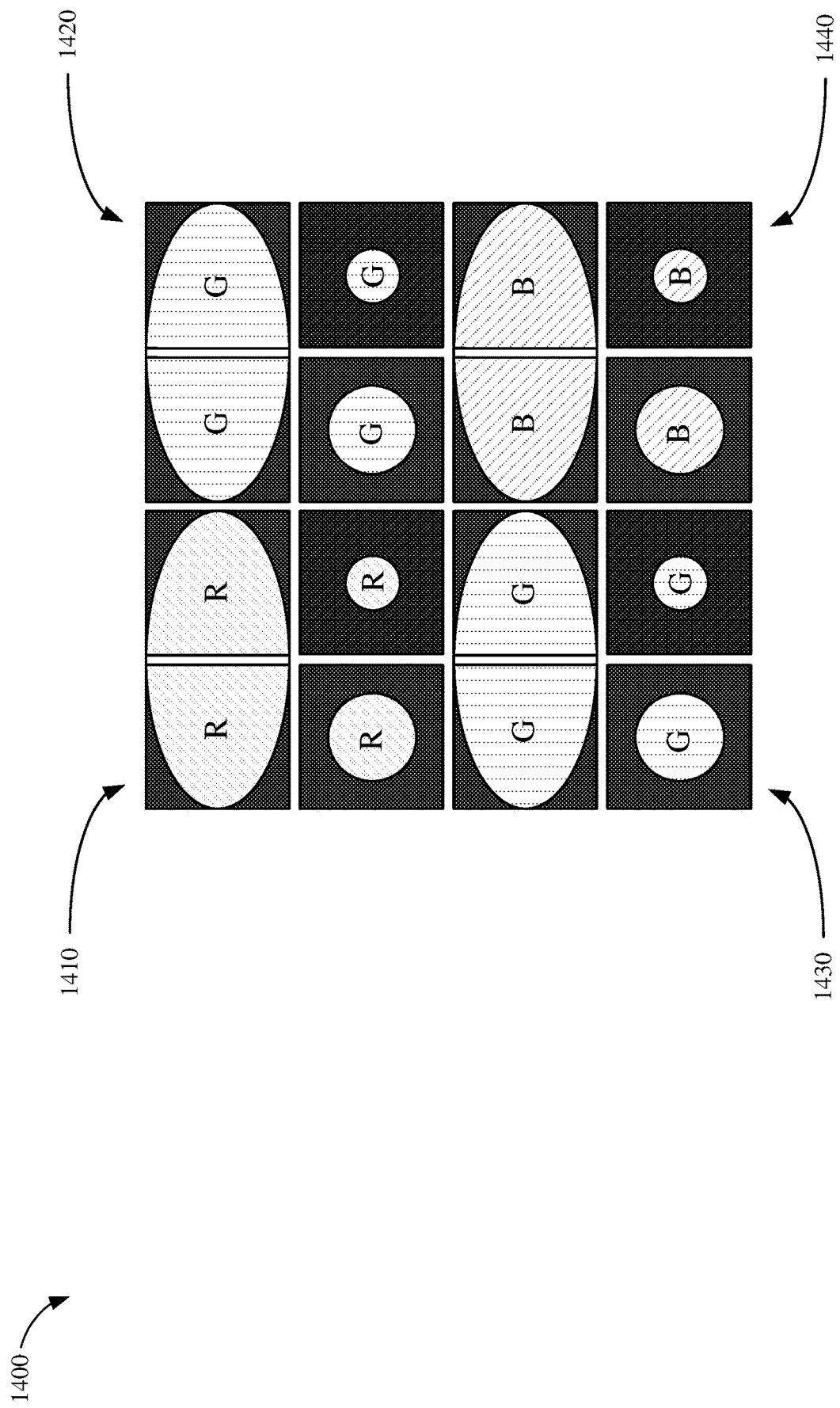
FIG. 14 is a depiction of an example configuration of a tile of quads for a quad Bayer image sensor.

FIG. 14 depicts an example configuration of a tile 1400 of quads 1410-1440 of a quad Bayer image sensor configured for PDAS functionality. Each quad 1410-1440 may be configured similar to quad 1300 (FIG. 13A) and coupled to a same color filter. For example, quad 1410 includes R pixels, quad 1420 includes G pixels, quad 1430 includes G pixels, and quad 1440 includes B pixels.

Each quad 1410-1440 is configured for the device 100 to perform AS, and the tile 1400 includes four PD pixel pairs for performing PD. For example, each quad includes a PD pixel pair configured to capture image data from a left perspective and a right perspective, a pixel coupled to a mask with a first aperture size, and a pixel coupled to a mask with a second aperture size. In this manner, the device 100 may combine the pixel image values from each quad to associate the quad with at least three exposure regions.

Figure 15:
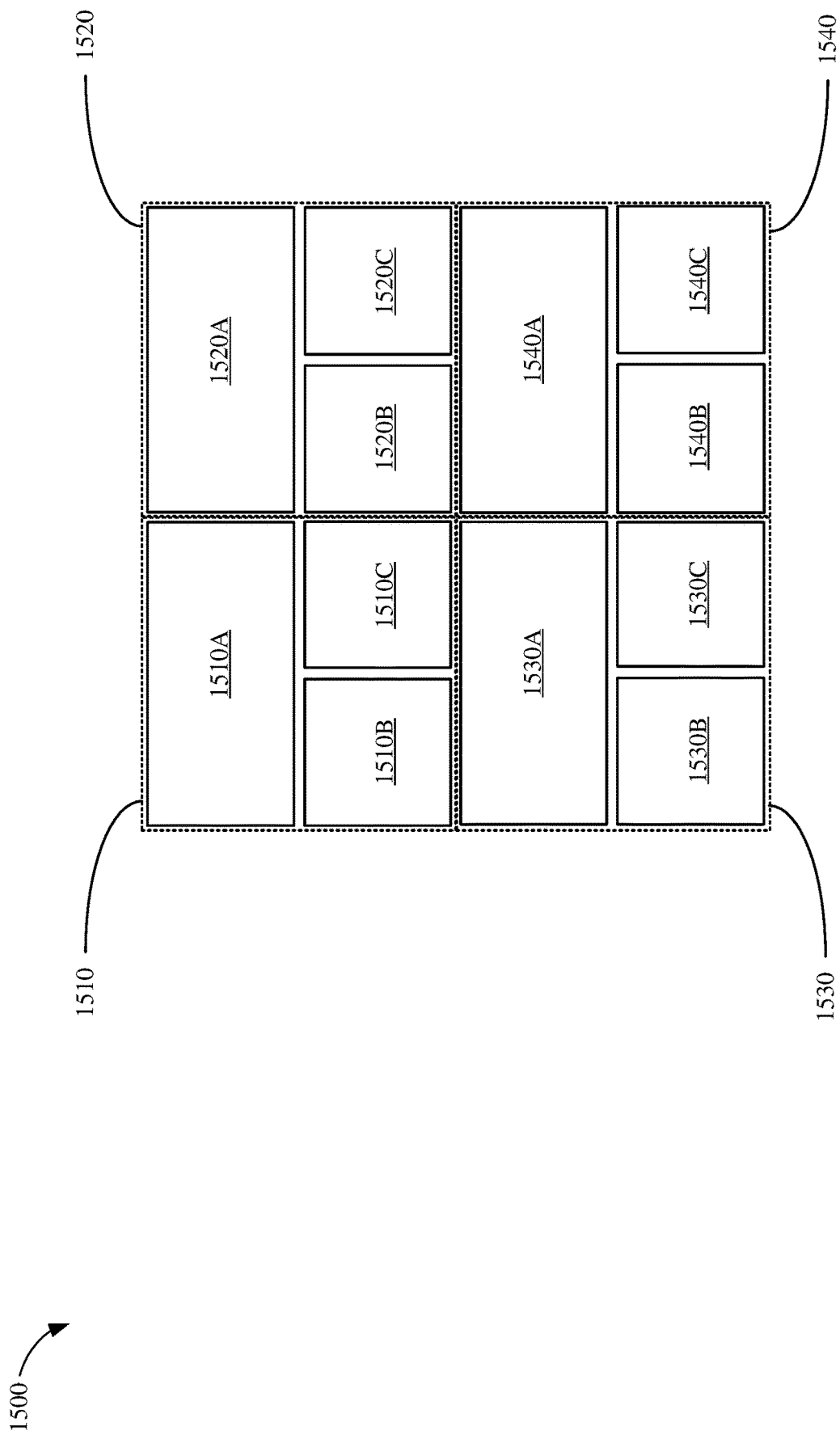
FIG. 15 is a depiction of the pixels corresponding to the exposure regions of the tile in FIG. 14.

FIG. 15 is a depiction 1500 of the logical association of the pixels to exposure regions of the tile 1400 in FIG. 14. As shown, each of the regions 1510-1540 (corresponding to quads 1410-1440, respectively) includes three exposure regions. As shown, the combined image values for the PD pixels of each quad may be associated with a first exposure region, the image value of the pixel coupled to a first aperture size mask of each quad may be associated with a second exposure region, and the image value of the pixel coupled to a second aperture size mask of each quad may be associated with a third exposure region. In this manner, quad 1410 is associated with exposure regions 1510A-1510C, quad 1420 is associated with exposure regions 1520A-1520C, quad 1430 is associated with exposure regions 1530A-1530C, and quad 1440 is associated with exposure regions 1540A-1540C. In comparing FIGS. 14 and 15, exposure regions 1510C-1540C correspond to the pixels of each quad 1410-1440 with the smallest sized aperture mask, and exposure regions 1510B-1540B correspond to the pixels of each quad 1410-1440 with larger sized aperture masks (or no masks, in some implementations). Exposure regions 1510A-1540A correspond to the PD pixel pairs of each quad 1410-1440.

The apertures are depicted as circular in FIGS. 10-14. However, the apertures may be any suitable shape, such as rectangular, hexagonal, octagonal, irregularly shaped, etc. Additionally, the tile 1400 in FIG. 14 shows the PD pixels above the non-PD pixels in each quad 1410-1440. However, the pixels in a quad may be in any suitable arrangement. For example, the PD pixels may be arranged below, to the left, or to the right of the non-PD pixels in the quad.

Figure 16:
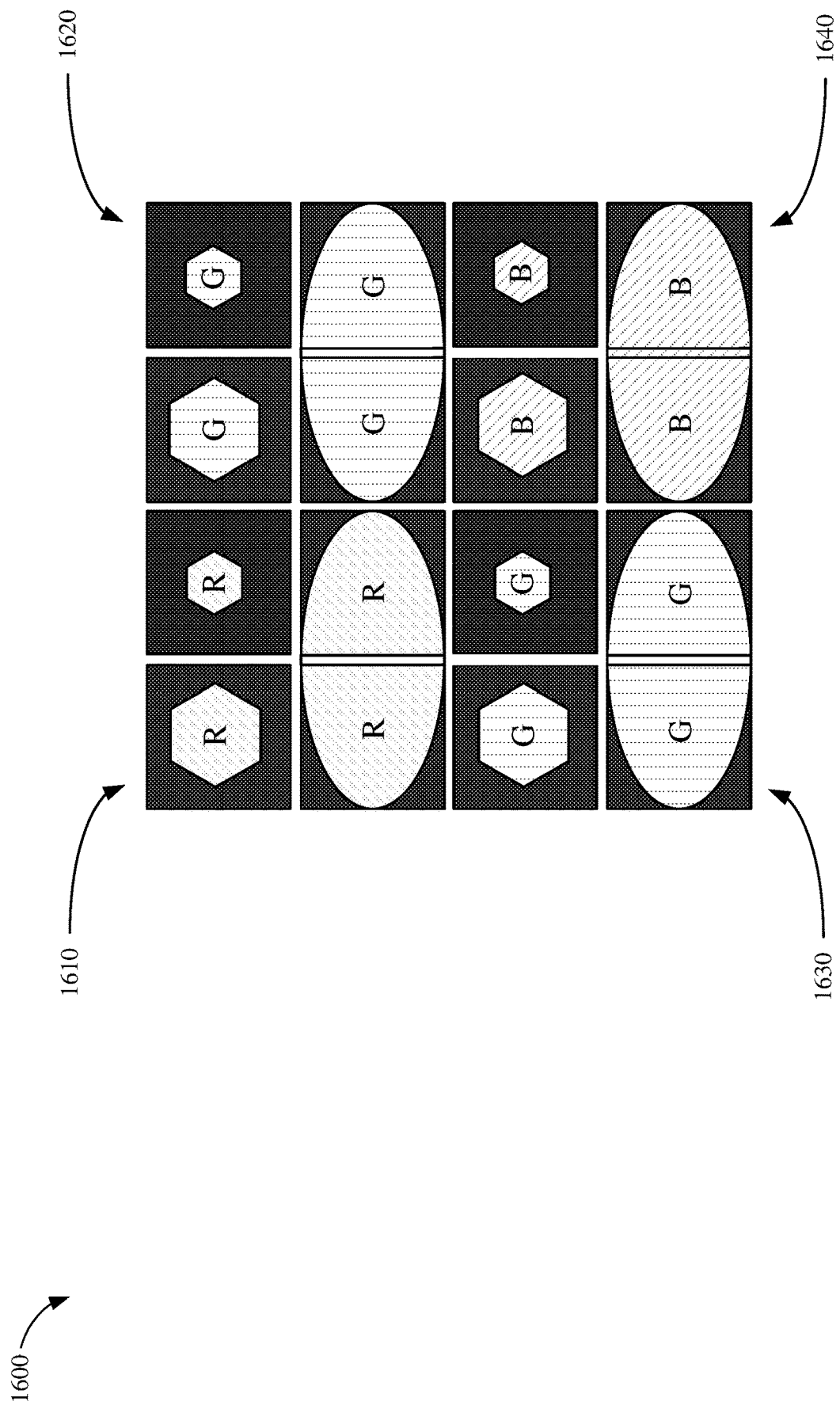
FIG. 16 is a depiction of an example configuration of a tile of quads for a quad Bayer image sensor.

FIG. 16 depicts an example configuration of a tile 1600 of quads 1610-1640 for a quad Bayer image sensor. Each quad 1610-1640 includes a PD pixel pair sharing a microlens and two pixels coupled to masks having different size apertures. In contrast to the tile 1400 in FIG. 14, the PD pixel pair is below the other pixels in each quad 1610-1640, and the apertures are hexagonal.

Figure 17:
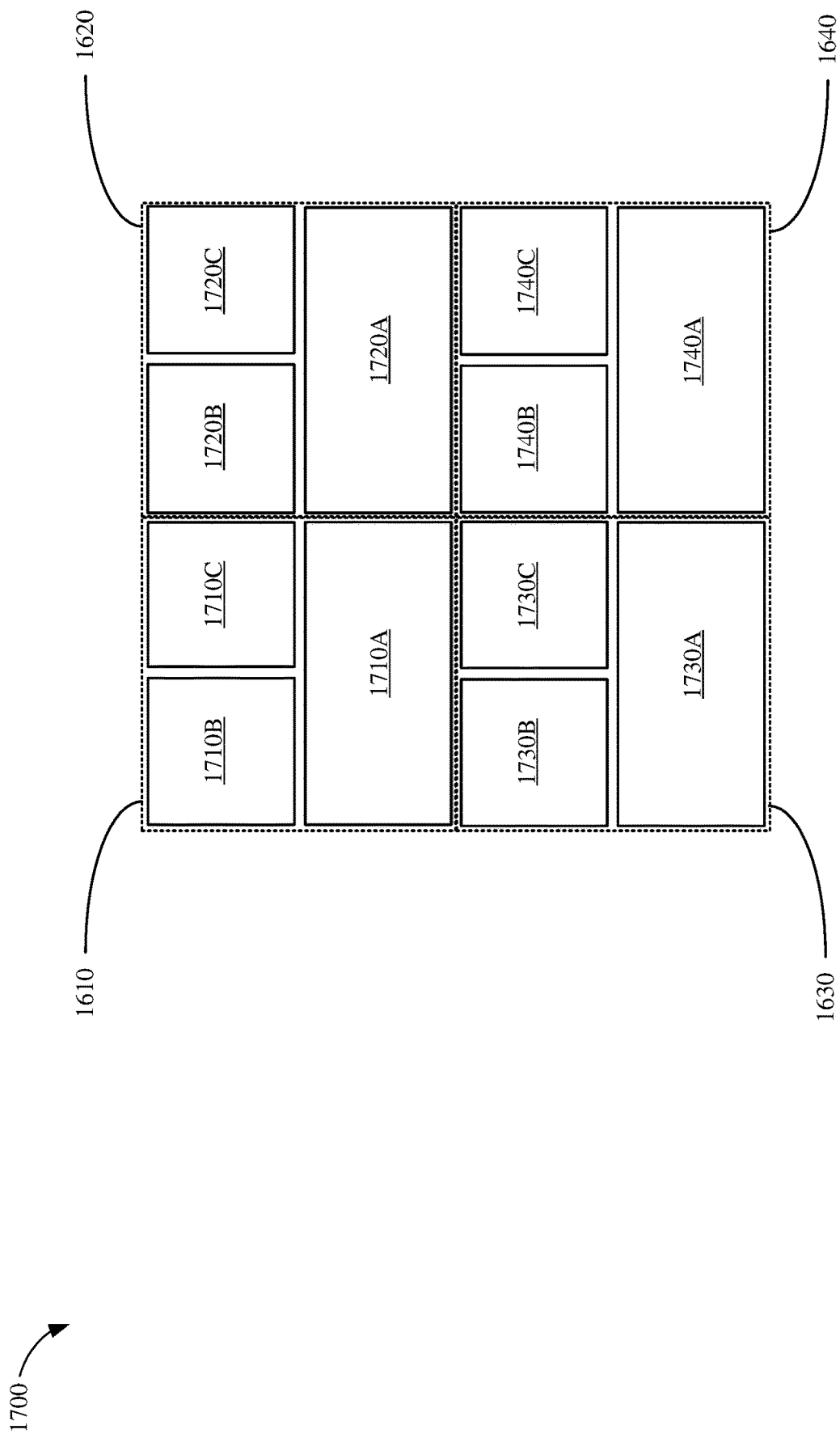
FIG. 17 is a depiction of the pixels corresponding to the exposure regions of the tile in FIG. 16.

FIG. 17 is a depiction 1700 of the logical association of the pixels to exposure regions of the tile 1600 in FIG. 16. As shown, each of the regions 1710-1740 (corresponding to quads 1610-1640, respectively) includes three exposure regions. As shown, the combined image values for the PD pixels of each quad may be associated with a first exposure region, the image value of the pixel coupled to a first aperture size mask of each quad may be associated with a second exposure region, and the image value of the pixel coupled to a second aperture size mask of each quad may be associated with a third exposure region. In this manner, quad 1610 is associated with exposure regions 1710A-1710C, quad 1620 is associated with exposure regions 1720A-1720C, quad 1630 is associated with exposure regions 1730A-1730C, and quad 1640 is associated with exposure regions 1740A-1740C. In comparing FIGS. 16 and 17, exposure regions 1710C-1740C correspond to the pixels of each quad 1610-1640 with the smallest sized aperture mask, and exposure regions 1710B-1740B correspond to the pixels of each quad 1610-1640 with larger sized aperture masks (or no masks, in some implementations). Exposure regions 1710A-1740A correspond to the PD pixel pairs of each quad 1610-1640.

While the tiles in FIGS. 10-16 are shown with the quads having a uniform orientation, in some other implementations, the orientation of the quads may differ in the tile or throughout the image sensor. For example, a tile may include an R pixel quad and a G pixel quad with orientations similar to quads 1410 and 1420 in FIG. 14, and my further include a G pixel quad and a B pixel quad with orientations similar to quads 1610 and 1620 in FIG. 16. In another example, an image sensor may include a plurality of tiles similar to tile 1400 in FIG. 14 and another plurality of tiles similar to tile 1600 in FIG. 16. Additionally, while FIGS. 14 and 16 show the PD pixels being paired with a shared microlens and combined for an exposure region, in some other implementations, the PD pixel pairs may be configured using masks or shields (such as in FIGS. 11-12B).

Figure 18:
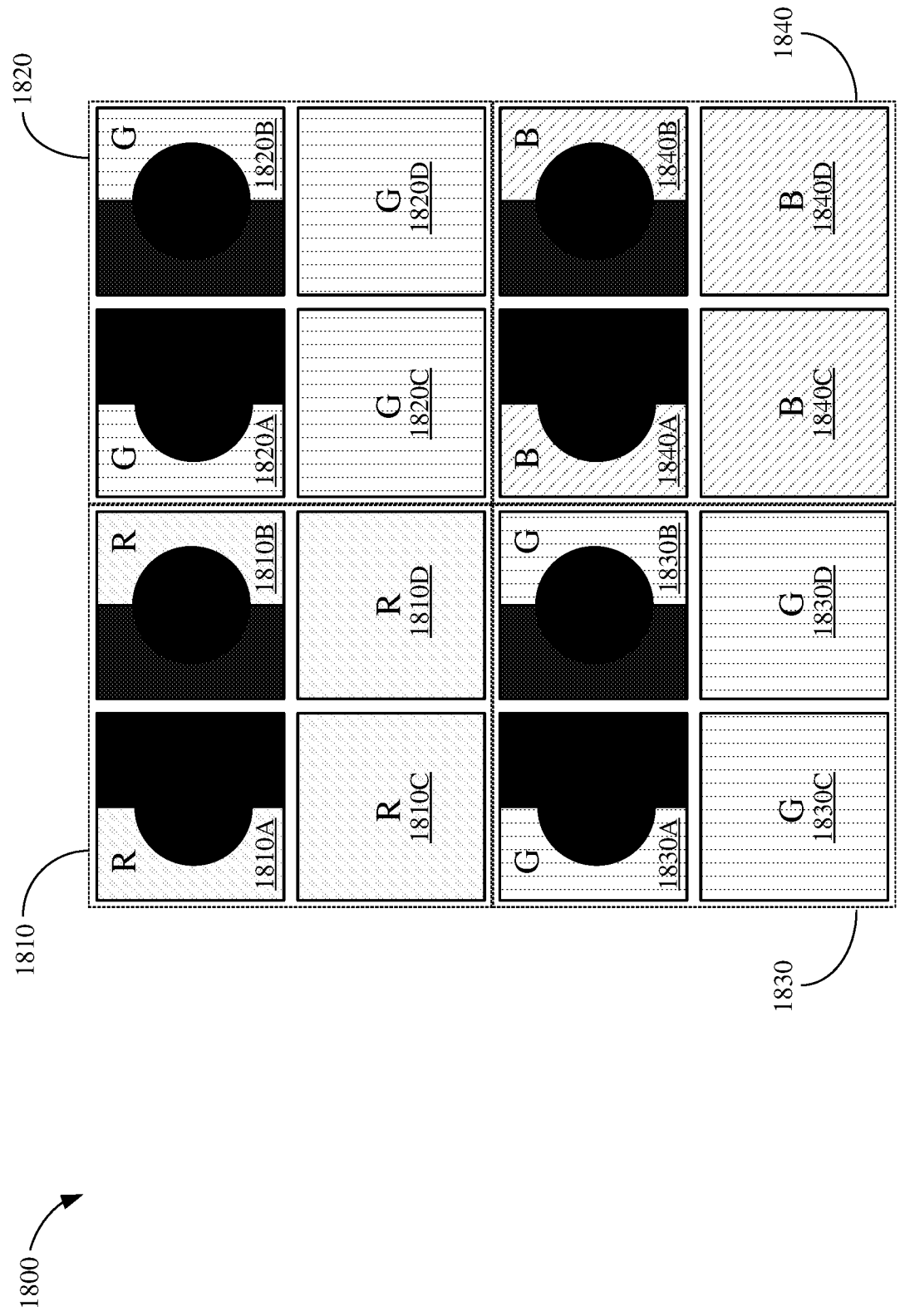
FIG. 18 is a depiction of another quad Bayer image sensor tile configured for phase detection and aperture simulation.

FIG. 18 is a depiction of another quad Bayer image sensor tile 1800 configured for PDAS functionality. The tile 1800 includes quads 1810-1840. Quad 1810 is coupled to red color filters and includes the pair of PD pixels 1810A and 1810B and the pixels 1810C and 1810D. Quad 1820 is coupled to green color filters and includes the pair of PD pixels 1820A and 1820B and the pixels 1820C and 1820D. Quad 1830 is also coupled to green color filters and includes the pair of PD pixels 1830A and 1830B and the pixels 1830C and 1830D. Quad 1840 is coupled to blue color filters and includes the pair of PD pixels 1840A and 1840B and the pixels 1840C and 1840D. In contrast to the tile in FIGS. 14 and 16, the PD pixels 1810A-1840A and 1810B-1840B are configured using a mask or shield to occlude a portion of the pixel surface. As noted above, the arrangement and configuration of the quads in the tile 1800 and the tiles in the quad Bayer image sensor may be any suitable arrangement and configuration. For example, one or more of the pixels 1810C-1840C and 1810D-1840D may include a mask with any suitable size and shape aperture. Additionally, the PD pixel pair may be above, below, left, or right of the non-PD pixels in each quad.

While the above illustrations and examples depict the PD pixels as capturing image data from left and right perspectives, the PD pixels may be oriented to capture image data in other perspectives. For example, if PD pixel pairs across the image sensor have the same orientation, the PD pixel pairs may not accurately determine depths of some types of objects in a scene. For example, when PD pixels capture image data from a left perspective and a right perspective, depths may not be accurately determined for objects having vertical edges but lacking horizontal edges (e.g., a roof). Two-dimensional images of such objects may appear similar from a range of horizontal shifts or potential disparities. As a result, determining the actual disparity—and thus the actual depth of the object—may be difficult. For example, the captured image data for such an object may be similar for the left and right PD pixels, and therefore may result in an inaccurate measurement of a phase or disparity in determining a depth.

In some implementations, the image sensor may include two or more orientations of PD pixel pairs (or groups of PD pixels). For example, an image sensor may include a first group of PD pixel pairs horizontally oriented and a second group of PD pixel pairs vertically oriented. Pixels of vertically oriented PD pixel pairs may capture image data from an upper and lower perspective. Pixels of horizontally oriented PD pixel pairs may capture image data from a left and right perspective. In some implementations, a tile of the image sensor may include different orientations for different PD pixel pairs. In some other implementations, a first group of a plurality of quads of an image sensor may include PD pixels configured to capture image data from a first perspective and capture image data from a second perspective, with the first perspective and the second perspective being oriented in a first direction. For a second group of a plurality of quads, the first perspective and the second perspective associated with the PD pixels may be oriented in a second direction. For example, the first direction may be a horizontal direction and the second direction may be a vertical direction.

Figure 19:
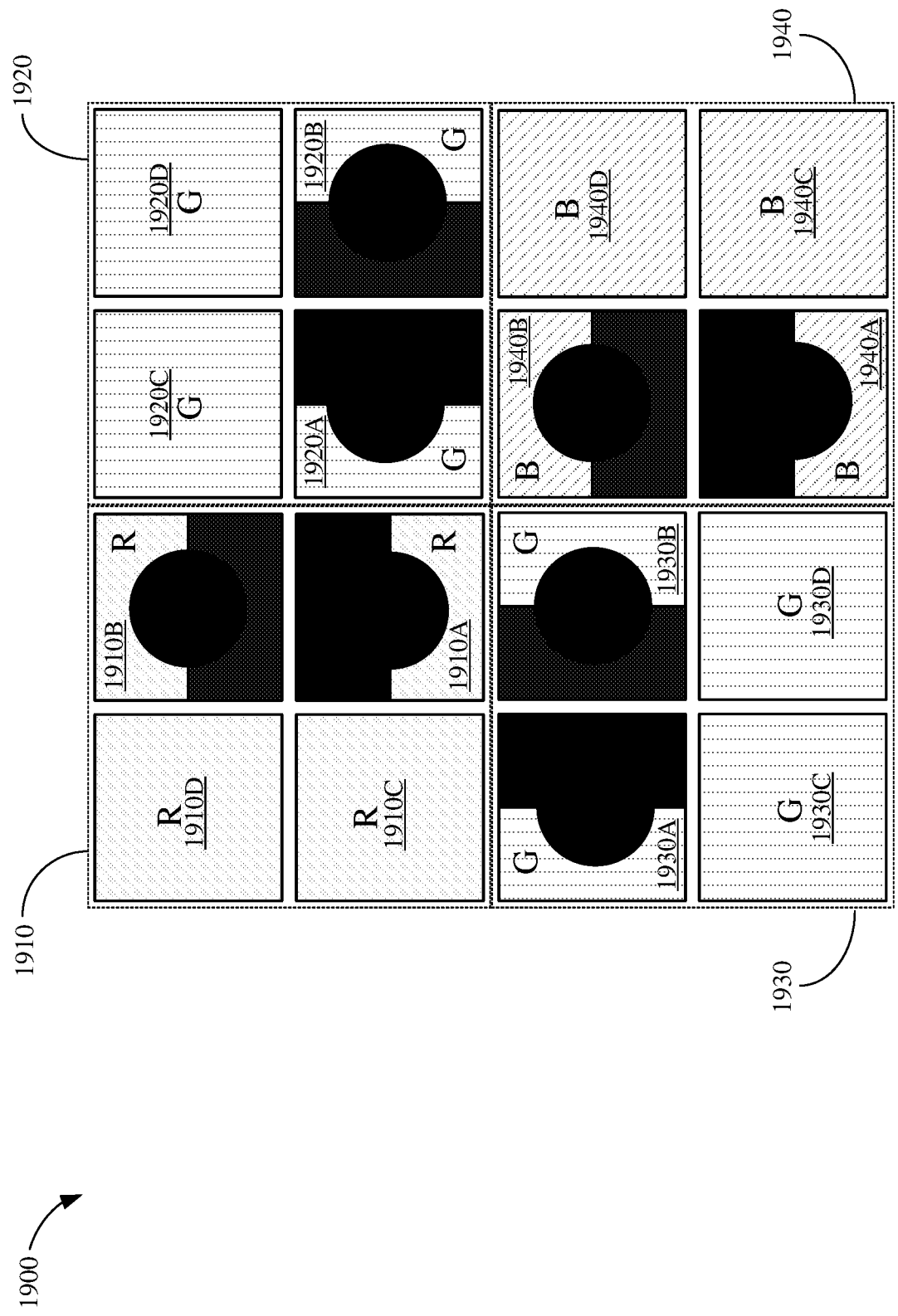
FIG. 19 is a depiction of an example configuration of a tile of quads incorporating vertical and horizontal phase detection pixel pairs.

FIG. 19 depicts an example configuration of a tile 1900 of quads incorporating vertical and horizontal PD pixel pairs. R quad 1910 and B quad 1940 may be configured to include vertical PD pixels 1910A-1910B and 1940A-1940B, respectively. G quads 1920 and 1930 may be configured to include horizontal PD pixels 1920A-1920B and 1930A-1930B, respectively. The PD pixel pairs in the tile 1900 in FIG. 19 are configured using masks or shields, as described herein. The quads 1910-1940 also include non-PD pixels 1910C-1940C and 1910D-1940D. While the pixels 1910C-1940C and 1910D-1940D are not shown to include masks with apertures, any of the pixels may include masks with any suitable size aperture. For example, one or more quads 1910-1940 may include pixels coupled to masks similar to as illustrated in FIG. 14 or FIG. 16.

Figure 20:
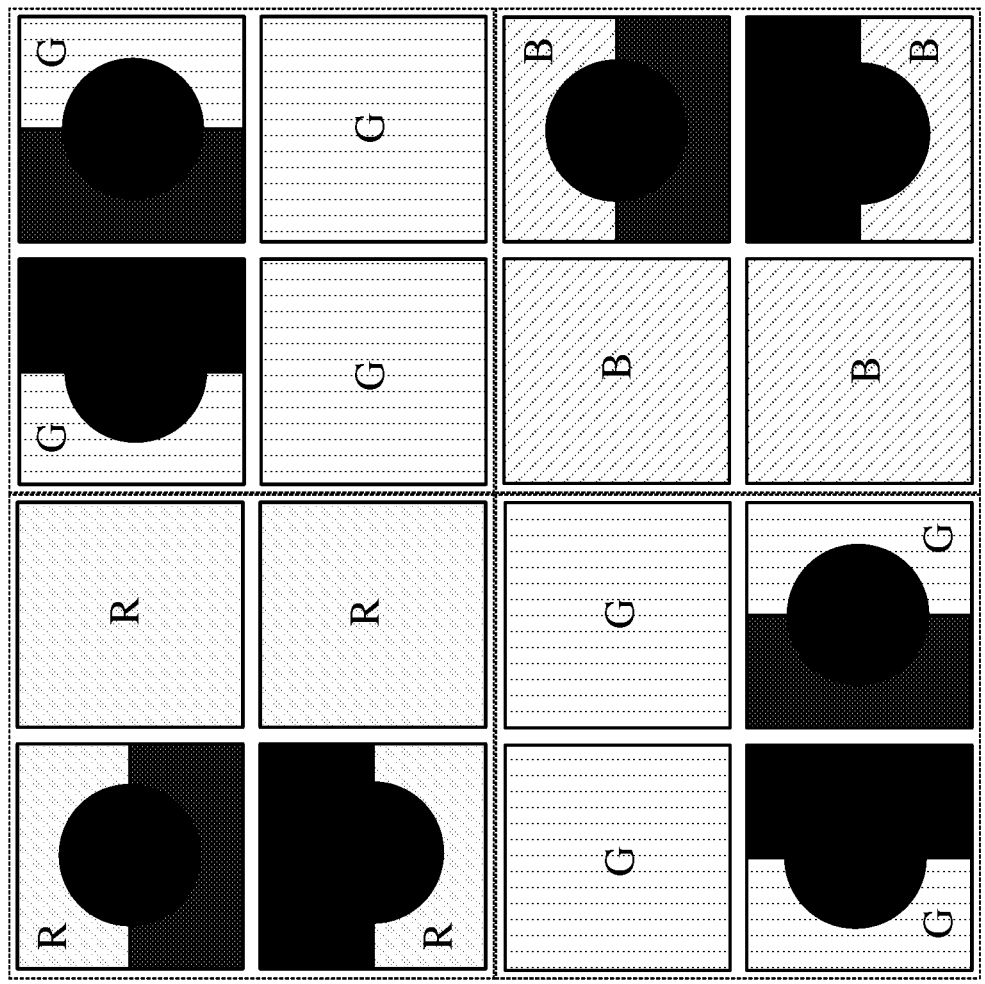
FIG. 20 is a depiction of another example configuration of a tile of quads incorporating vertical and horizontal phase detection pixel pairs configured using masks.

FIG. 20 depicts another example configuration of a tile 2000 of quads incorporating vertical and horizontal PD pixel pairs configured using masks. As compared to the tile 1900 in FIG. 19, the PD pixel pairs are located on an outer portion of the tile. The image sensor may have suitable configurations of the pixels, quads, and tiles other than as depicted in the examples, and the present disclosure is not limited to the illustrated example configurations. As noted herein, PD pixel pairs may be configured using a shared microlens. The following depictions are example implementations of a quad Bayer image sensor tile with vertical and horizontal PD pixel pairs including shared microlenses (and may be associated by the device 100 with three exposure regions per quad).

Figure 21:
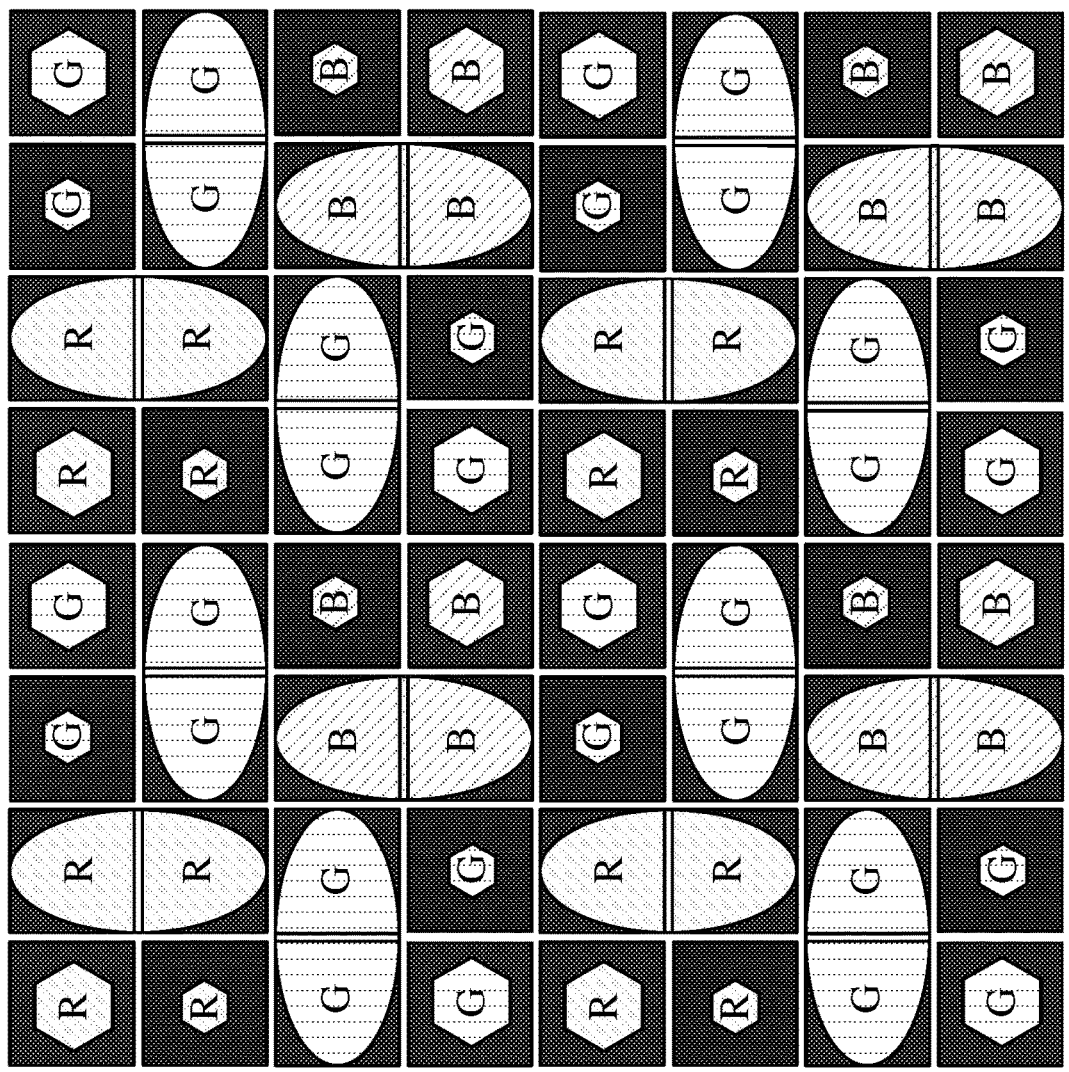
FIG. 21 is a depiction of a 2×2 configuration of four quad Bayer tiles of an example image sensor.
Figure 22:
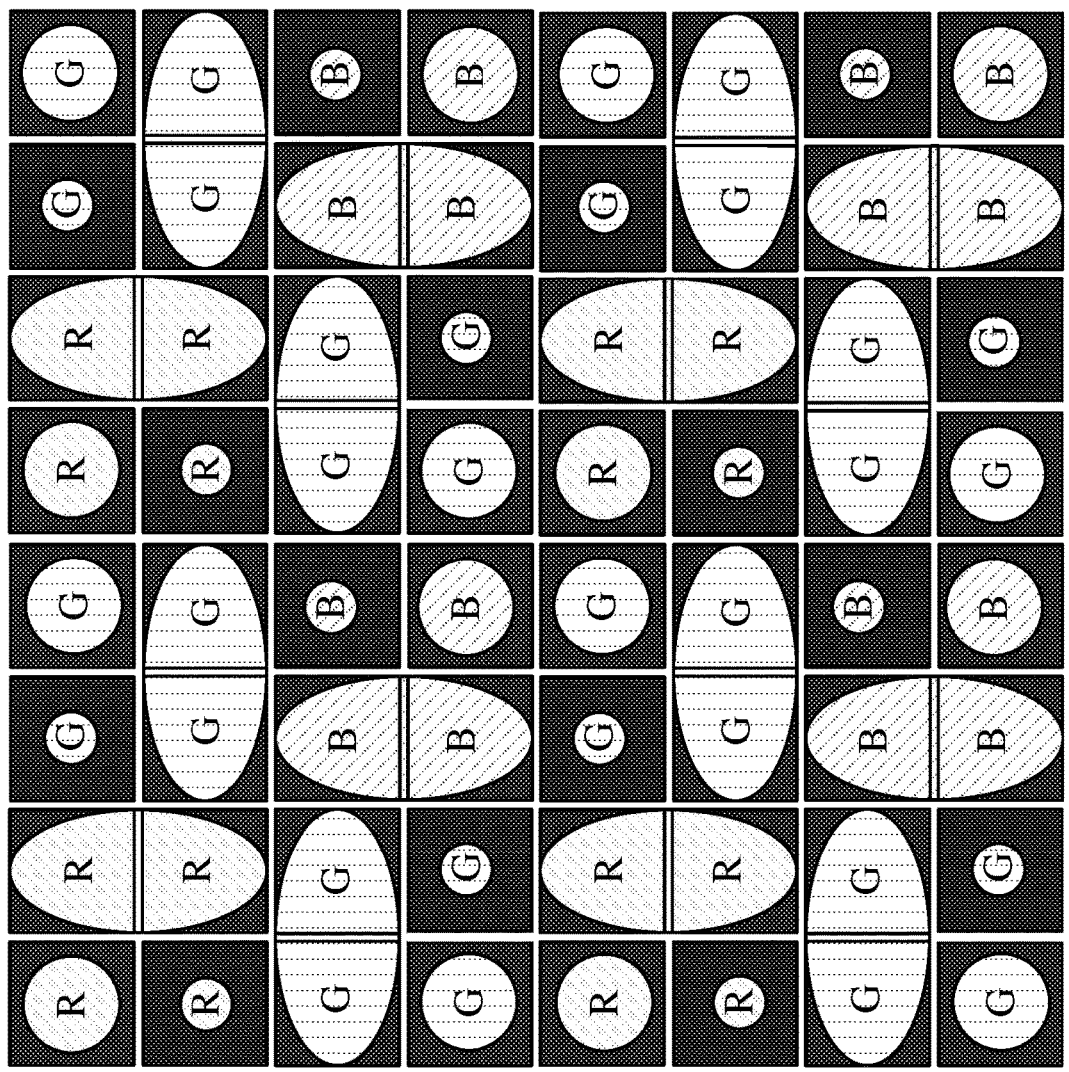
FIG. 22 is a depiction of another 2×2 configuration of four quad Bayer tiles of an example image sensor.
Figure 23:
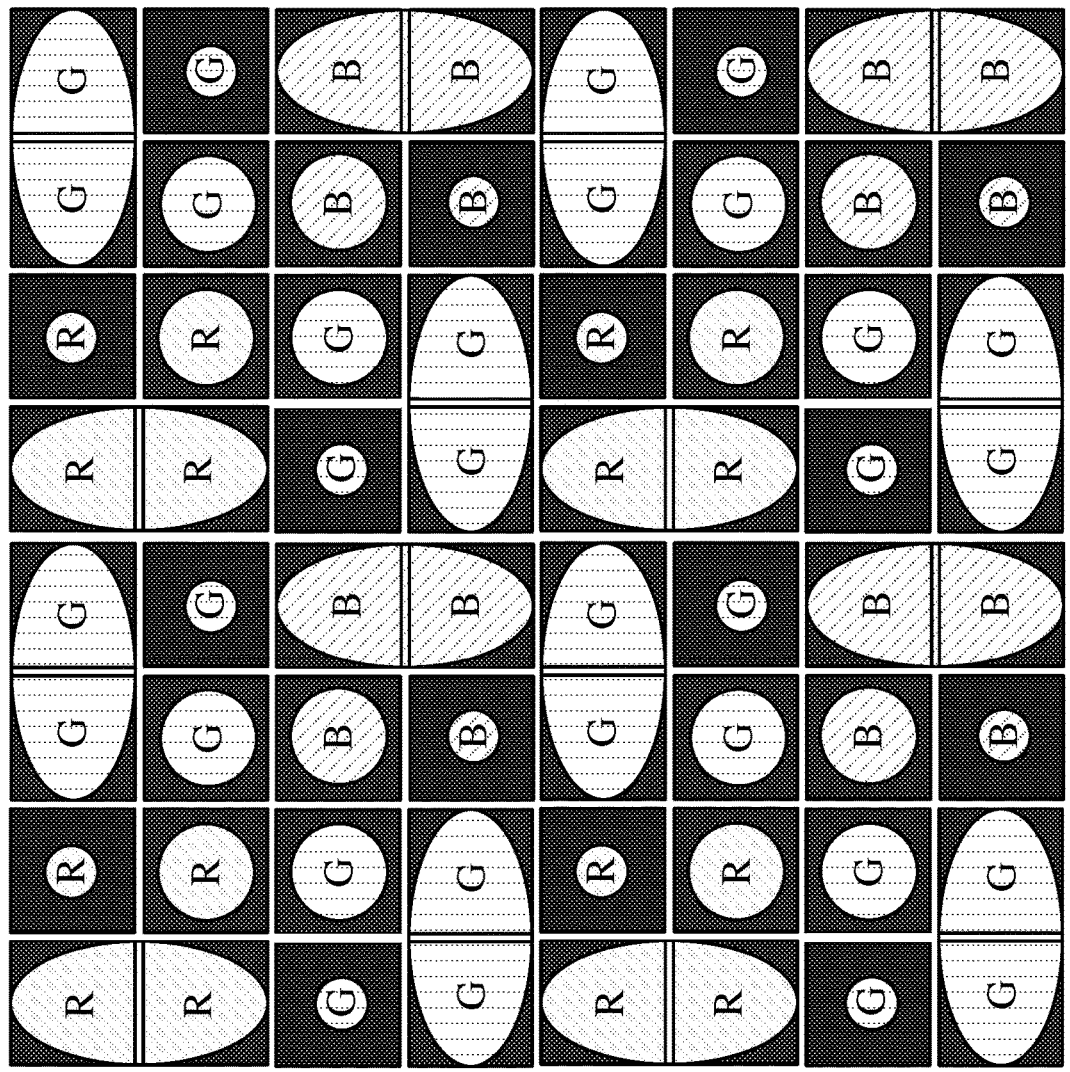
FIG. 23 is a depiction of a further 2×2 configuration of four quad Bayer tiles of an example image sensor.

FIG. 21 depicts a 2×2 configuration 2100 of four quad Bayer tiles of an example image sensor. As shown, the apertures are hexagonal shape and may differ in size within each quad. Additionally, G PD pixel pairs are horizontally oriented, and R PD pixel pairs and B PD pixel pairs are vertically oriented. FIG. 22 depicts a 2×2 configuration 2200 of four quad Bayer tiles of an example image sensor. In contrast to the tiles in FIG. 21, the apertures are circular. FIG. 23 depicts a 2×2 configuration 2300 of four quad Bayer tiles of an example image sensor. In contrast to the tiles in FIG. 22, the PD pixel pairs are located on the outer portion of each quad.

Figure 24:
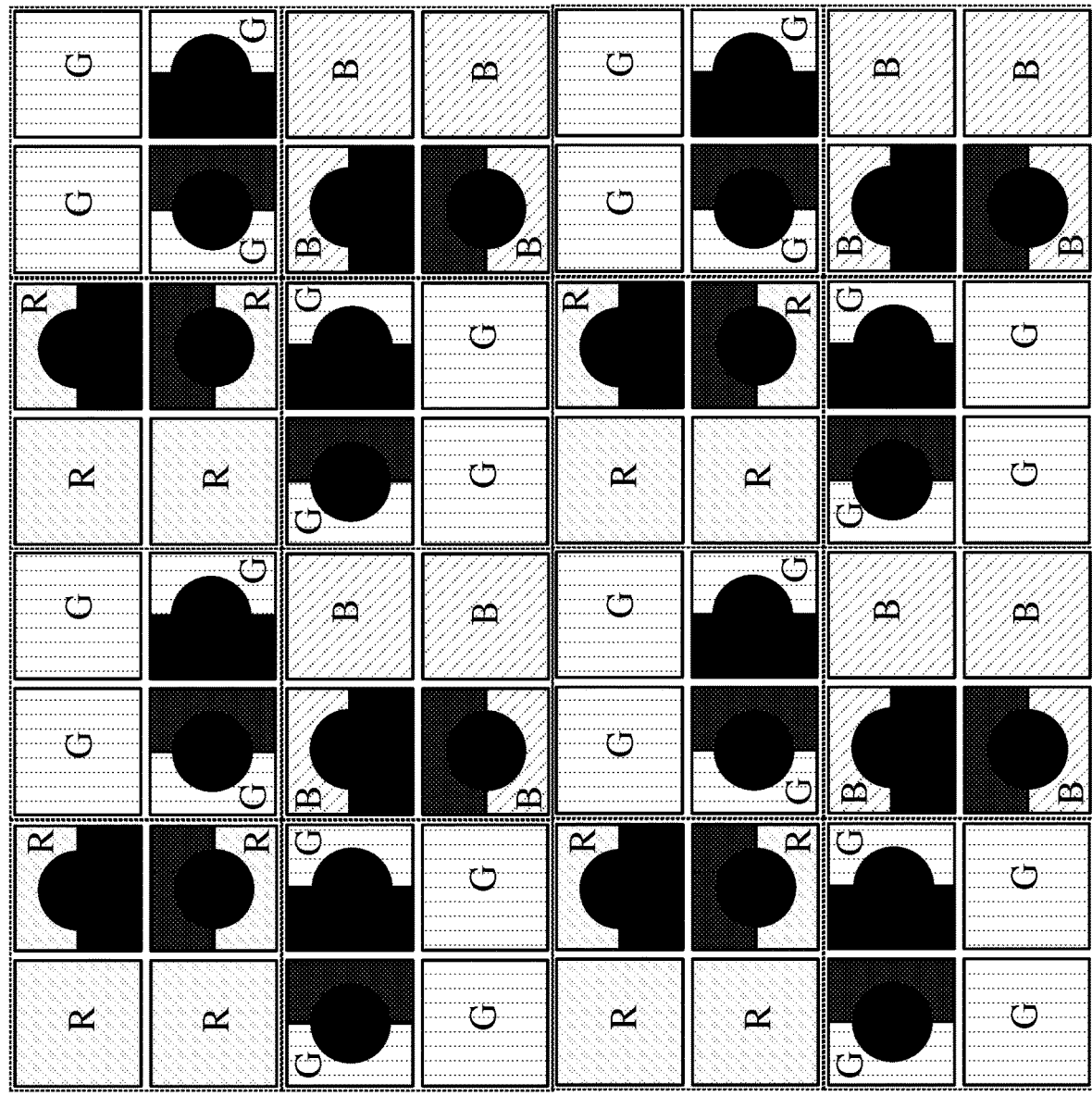
FIG. 24 is a depiction of another 2×2 configuration of four quad Bayer tiles of an example image sensor.
Figure 25:
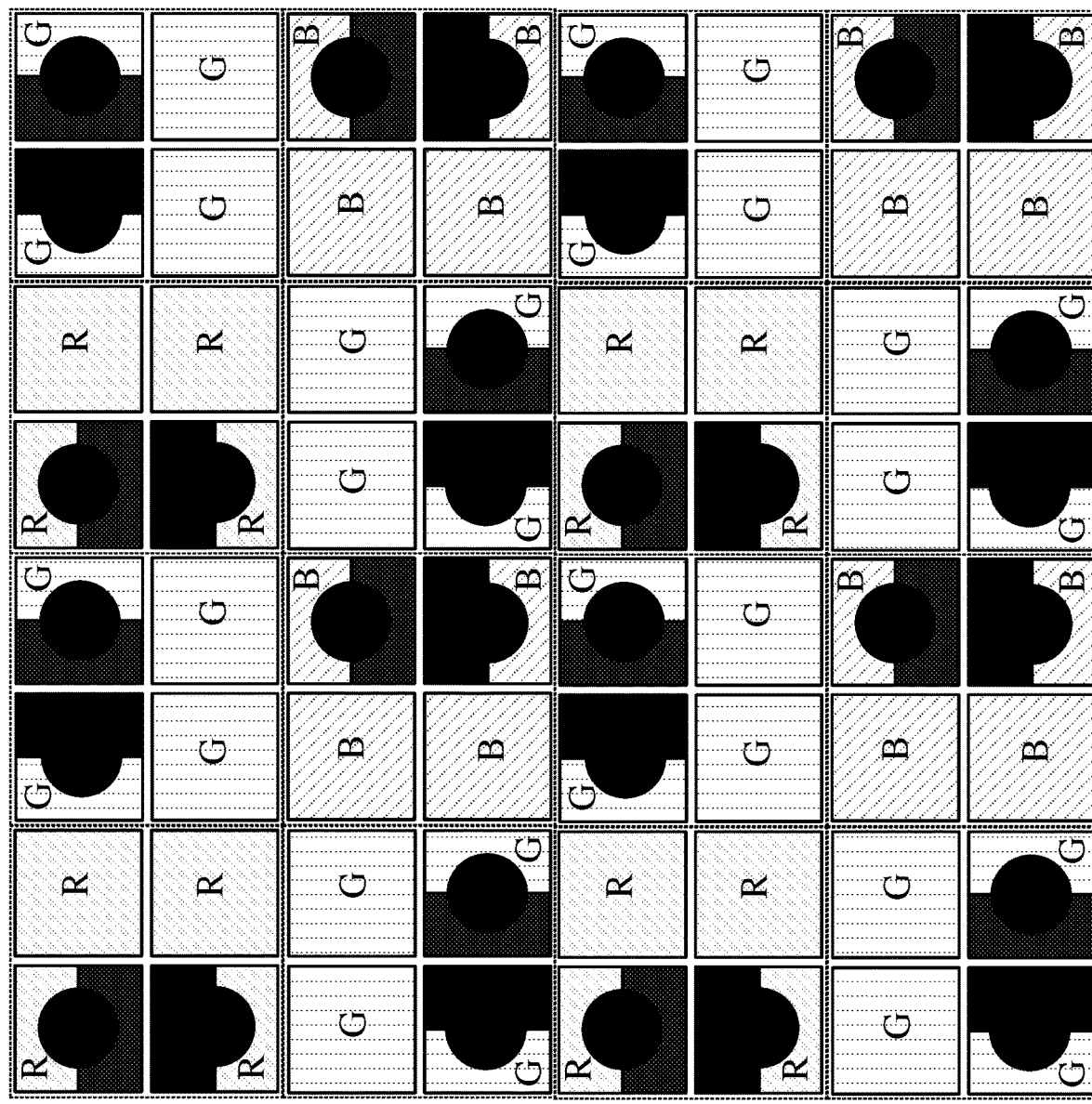
FIG. 25 is a depiction of a further 2×2 configuration of four quad Bayer tiles of an example image sensor.

FIG. 24 depicts a 2×2 configuration 2400 of four quad Bayer tiles of an example image sensor. The arrangement of pixels in the configuration 2400 may be similar to the arrangement of pixels in the configuration 2200 in FIG. 22, except the PD pixel pairs are configured using masks. FIG. 25 depicts a 2×2 configuration 2500 of four quad Bayer tiles of an example image sensor. The arrangement of pixels in the configuration 2500 may be similar to the arrangement of pixels in the configuration 2300 in FIG. 23, except the PD pixel pairs are configured using masks.

Figure 26:
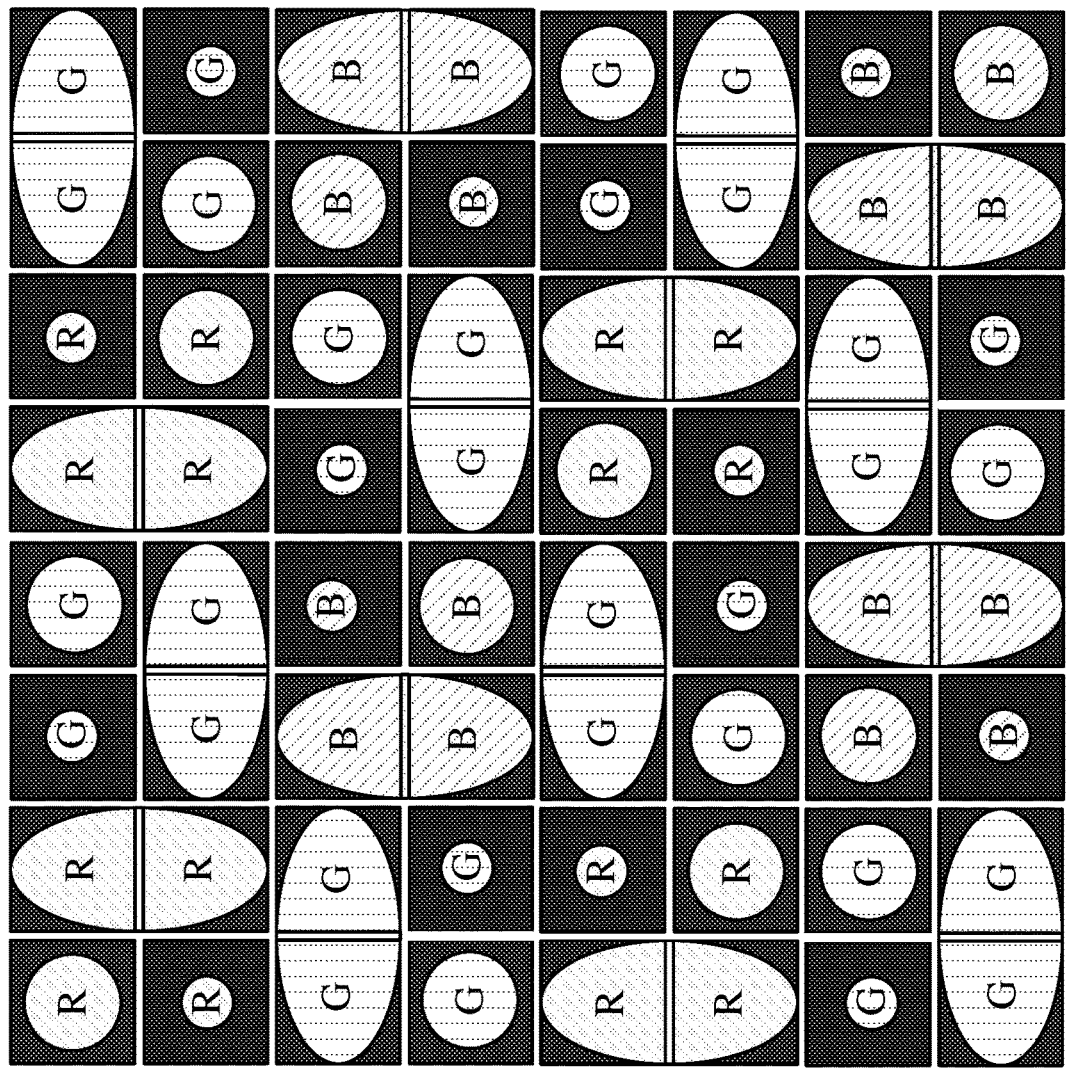
FIG. 26 is a depiction of another 2×2 configuration of four quad Bayer tiles of an example image sensor.
Figure 27:
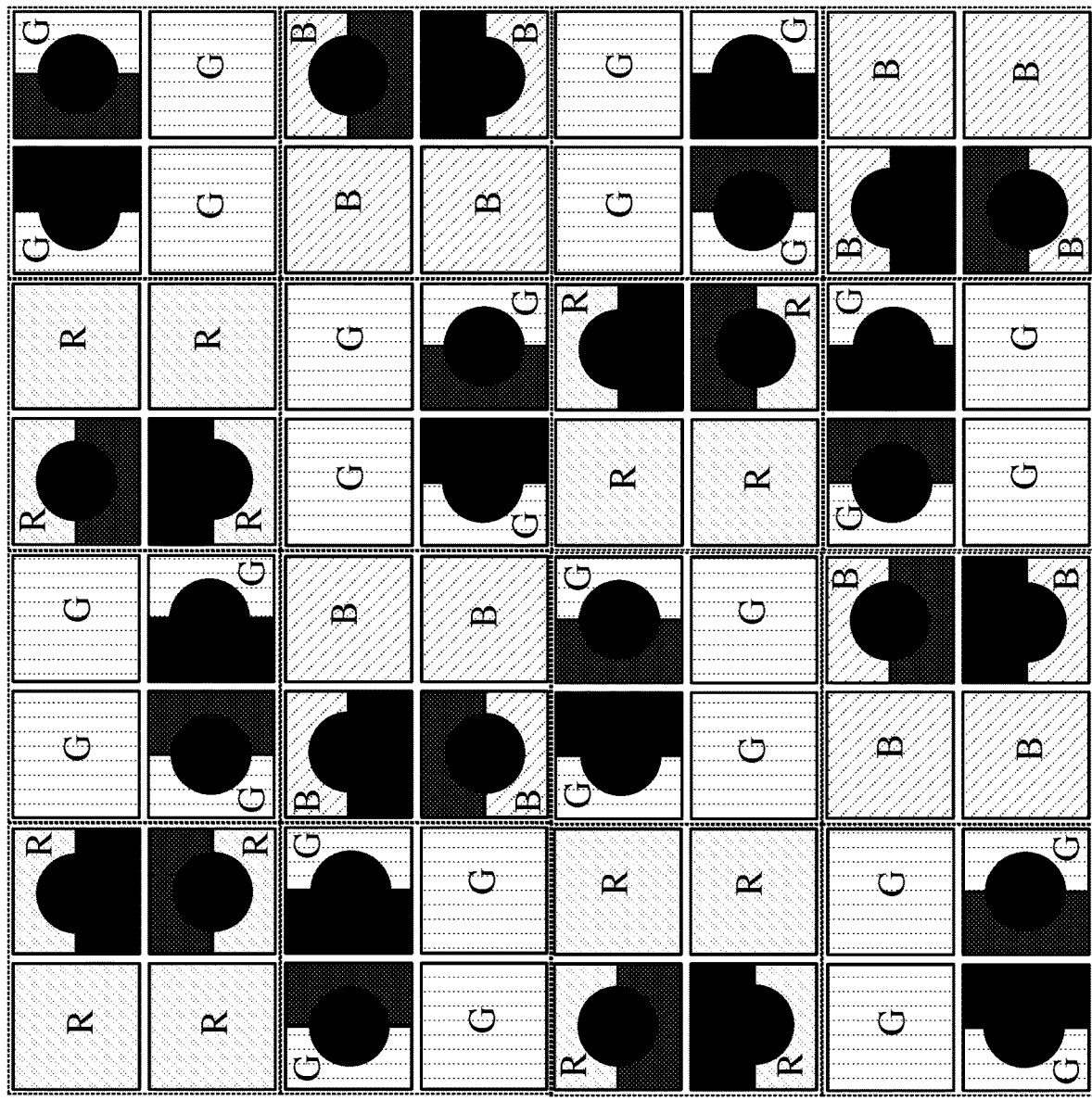
FIG. 27 is a depiction of a further 2×2 configuration of four quad Bayer tiles of an example image sensor.

While FIGS. 21-25 show the tiles having a uniform orientation and configuration for the image sensor, a configuration may include tiles with different pixel arrangements and orientations. FIG. 26 depicts a 2×2 configuration 2600 of four quad Bayer tiles of an example image sensor. As shown, the configuration alternates between tiles similar to as shown in configuration 2200 (FIG. 22) and tiles similar to as shown in configuration 2300 (FIG. 23). FIG. 27 depicts a 2×2 configuration 2700 of four quad Bayer tiles of an example image sensor. As shown, the configuration alternates between tiles similar to as shown in configuration 2400 (FIG. 24) and tiles similar to as shown in configuration 2500 (FIG. 25).

While the configuration shows the green PD pixel pairs as having a horizontal orientation for an image sensor, the image sensor may include different orientations of green PD pixel pairs. Alternatively or additionally, the image sensor may include different orientations of other color PD pixel pairs.

Figure 28:
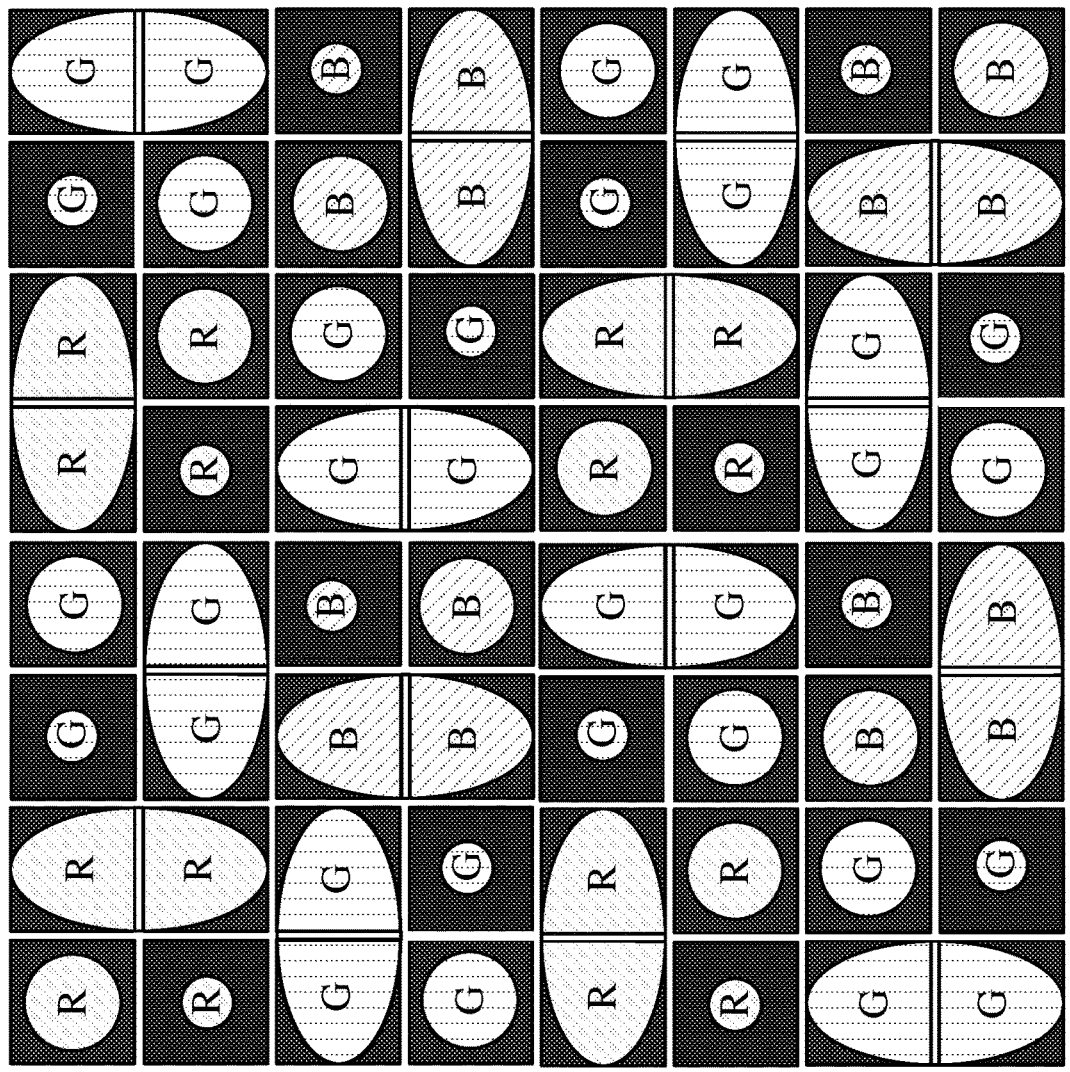
FIG. 28 is a depiction of another 2×2 configuration of four quad Bayer tiles of an example image sensor.

FIG. 28 depicts a 2×2 configuration 2800 of four quad Bayer tiles of an example image sensor. As shown, the top-left tile and bottom-right tile in the configuration 2800 include green PD pixel pairs in a horizontal orientation, and the top-right tile and bottom-left tile in the configuration 2800 include green PD pixel pairs in a vertical orientation. While a plurality of example configurations for an image sensor have been provided herein, other suitable configurations may be used, and the present disclosure is not limited to the provided examples.

As noted above, HDR imaging may include capturing image data for three frames using different exposure settings for each frame. If the image sensor of the camera 102 is configured for AS, and the device 100 may associate each quad with at least three exposure regions based on combining image values from the quad, the device 100 may perform HDR imaging based on one frame of captured image data. For example, HDR imaging may be performed exclusively on one frame of captured image data. In performing HDR imaging for a quad Bayer image sensor including PDAS functionality, the array of captured image data may be used to simulate a Bayer image sensor capturing image data for three frames using different simulated aperture sizes. For example, referring back to FIGS. 14 and 15, the device 100 may set the captured image data of the PD pixels of the tile 1400 associated with exposure regions 1510A-1540A as the captured image data using a first exposure setting, the captured image data of the pixels coupled to a first aperture size mask associated with exposure regions 1510B-1540B as the captured image data using a second exposure setting, and the captured image data of the pixels coupled to a second aperture size mask associated with exposure regions 1510C-1540C as the captured image data using a third exposure setting. In some implementations, the PD pixels of the tiles may be used for PD (such as for PDAF or depth sensing).

In addition or alternative to HDR imaging, the device 100 may be configured to selectively perform AS to use captured image data from the pixels to simulate a desired exposure setting. For example, if a small aperture is to be simulated, the device 100 may use captured image data associated with exposure regions 1510C-1540C, and not use captured image data associated with exposure regions 1510A-1540A and 1510B-1540B.

In some example implementations, the device 100 may be configured to adjust the exposure windows of pixels (based on aperture size) for a quad Bayer image sensor with PDAS functionality. For example, if some pixels include a mask with an aperture size different than for other pixels in the quad, the device 100 may set the exposure time to compensate for differences in the sizes of the photosensitive regions.

In this manner, the image sensor may capture image data that is equivalent to captures from conventional quad Bayer image sensors.

In some implementations, example quad Bayer image sensors including PDAS functionality may enable a device to have a simplified camera not requiring a VCM (such as a front-facing camera of a smartphone or tablet). For example, the device 100 may use aperture simulation to perform a bokeh effect, which would typically require a VCM moving a lens position until a subject is in focus and use a narrow depth of field. However, the device 100 may use a quad Bayer image sensor with PDAS functionality to determine a distance to the subject using PD and use pixels (or a combination of captured image data to simulate pixels) associated with the desired aperture size given the determined distance.

FIG. 29 is an illustrative flow chart depicting an example operation 2900 for capturing image data using a quad Bayer image sensor with PDAS functionality. While the example operation 2900 is described as being performed by the device 100, any suitable image processing device may be used, and the present disclosure is not limited to the device 100.

Beginning at 2902, the camera 102, using the quad CFA image sensor, may capture one or more frames of image data. For example, for each quad of a quad Bayer CFA image sensor, a first non-PD pixel of the quad may capture image data (2904), a second non-PD pixel may capture image data (2906), a first PD pixel of the quad may capture image data from a first perspective (2908), and a second PD pixel of the quad may capture image data from a second perspective (2910). Any suitable quad CFA image sensor may be used to capture the one or more frames of image data. For example, a quad Bayer CFA image sensor configured as depicted, e.g., in FIGS. 21-28 may be used.

The device 100 (such as the processor 104, the image signal processor 112, or another suitable component) may process the one or more frames of captured image data (2912). For example, the image signal processor 112 may receive and process the capture image data during an image processing pipeline (such as to generate images or video). The image signal processor 112 may apply a plurality of filters to the captured image data, such as blurring filters, edge enhancement filters, etc. In some implementations, the image signal processor 112 may perform AS in processing the captured image data from the one or more frames to simulate using different size apertures (2914). For example, the device 100, in combining image values from the pixels of each quad, may associate each quad with three exposure regions corresponding to different aperture sizes (such as described herein).

In some aspects of AS, the device 100 may generate an HDR image from simulated frames of captured image data using different size apertures (2916). For example, the device 100 may associate the captured image data (which may include one or more combined image values) simulating a first exposure region with a first frame of captured image data using a first aperture size. The device 100 may also associate the captured image data (which may also include one or more combined image values) simulating a second exposure region with a second frame of captured image data using a second aperture size. The device 100 may further associate the captured image data (which may include one or more combined image values) simulating a third exposure region with a third frame of captured image data using a third aperture size. For example, referring to the quad 1100 in FIG. 11, the device 100 may associate the combined image values from the pixels 1110 and 1120 with a first exposure region, may associate the image value from the pixel 1140 with a second exposure region, and may associate the image value from the pixel 1130 with a third exposure region. The device 100 may perform such associations for a plurality of quads of the image sensor of the camera 102. In this manner, the device 100 may simulate three frames of captured image data associated with three different aperture sizes, and the device 100 may combine the simulated frames of captured image data to generate an HDR image. In another example, the device 100 may use aperture simulation to simulate adjusting an exposure setting of a generated image or another suitable operation based on aperture simulation.

Referring back to FIG. 29, in some implementations, the device 100 (e.g., the image signal processor 112) may process the captured image data by detecting one or more phases from the captured image data for a depth-based operation (2918). For example, the device 100 may perform PDAF for the image sensor (2920). In other examples, the device 100 may generate a depth map, perform depth-sensing, etc. In detecting phases, the device 100 may compare the captured image data from the first perspective to the captured image data from the second perspective for PD. In some other implementations, the camera 102 may capture image data from a third perspective and a fourth perspective 90 degrees to the first perspective and the second perspective. The device 100 may therefore also compare the captured image data from the third perspective to the captured image data from the fourth perspective for PD. The phase differences may then be used for the PD operations (such as PDAF, depth map generation, etc.).

In this manner, the camera 102 is configured for phase detection and aperture simulation (PDAS) functionality. Further, since each quad of an image sensor includes PD pixels, phase detection may be denser than other image sensors. Additionally, since each quad includes multiple exposure zones, one frame of captured image data using a quad Bayer image sensor may be mosaiced for an image associated with a Bayer image sensor with different aperture sizes (such as an image with adjusted depth of field for a simulated Bayer sensor, an HDR image for a simulated Bayer sensor with different aperture sizes used for different frames, etc.).

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 130 in the example image processing device 100 of FIG. 1) comprising instructions that, when executed by the processor 104 (or the image signal processor 112), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random-access memory (SDRAM), read only memory (ROM), non-volatile random-access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the implementations disclosed herein may be executed by one or more processors, such as the processor 104 or the image signal processor 112 in the example image processing device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the image processing device 100, the processor 104, and/or the image signal processor 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A device, comprising:
    a quad color filter array (CFA) including a plurality of color filters;
    an image sensor configured to capture image data, the image sensor coupled to the quad CFA, wherein the image sensor includes a plurality of quads including a respective plurality of pixels, wherein for first quad of the plurality of quads:
        each pixel of a plurality of pixels of the first quad is coupled to a same color filter of the plurality of color filters;
        a first pixel of the plurality of pixels of the first quad is associated with a first exposure region of the first quad and corresponds to a first aperture size;
        a second pixel of the plurality of pixels of the first quad is associated with a second exposure region of the first quad and corresponds to a second aperture size; and
        at least two pixels of the plurality of pixels of the first quad are configured as phase detection (PD) pixels; and
    a processor implemented in circuitry and coupled to the image sensor, the processor configured to perform aperture simulation in processing one or more frames of captured image data to simulate capturing image data using at least one of the first aperture size, the second aperture size, or a third aperture size based on the at least two PD pixels.

2. The device of claim 1, wherein the quad CFA is a quad Bayer CFA including a plurality of 4×4 color filter arrangements, a 4×4 color filter arrangement of the plurality of 4×4 color filter arrangements including:
    a 2×2 patch of red color filters coupled to the first quad of the image sensor;
    a 2×2 patch of blue color filters coupled to a second quad of the image sensor;
    a first 2×2 patch of green color filters coupled to a third quad of the image sensor; and
    a second 2×2 patch of green color filters coupled to a fourth quad of the image sensor, wherein the first quad, the second quad, the third quad, and the fourth quad are arranged in a Bayer color filter pattern.

3. The device of claim 1, wherein each pixel of the image sensor includes one photosensitive surface for capturing image data.

4. The device of claim 1, wherein the first pixel is coupled to a first mask including the first aperture size, wherein the first mask is configured to direct light to the first exposure region.

5. The device of claim 4, wherein the second pixel is coupled to a second mask including the second aperture size, wherein the second mask is configured to direct light to the second exposure region.

6. The device of claim 1, wherein the at least two PD pixels include:
    a third pixel configured to capture data from a first perspective; and
    a fourth pixel configured to capture data from a second perspective, wherein the third pixel and the fourth pixel are associated with a third exposure region of the first quad corresponding to a third aperture size.

7. The device of claim 6, wherein the third pixel and the fourth pixel share a microlens configured to direct light to the third exposure region.

8. The device of claim 6, wherein:
    the first perspective and the second perspective associated with a first group of the plurality of quads are oriented in a first direction.

9. The device of claim 8, wherein:
    the first perspective and the second perspective associated with a second group of the plurality of quads are oriented in a second direction.

10. The device of claim 9, wherein a portion of the first group and a portion of the second group of the plurality of quads are coupled to green color filters.

11. The device of claim 1, wherein the processor is further configured to detect one or more phases from the captured image data.

12. The device of claim 11, wherein the processor is configured to perform a depth-based operation based on the one or more phases, wherein the depth-based operation includes at least one of:
    phase detection autofocus (PDAF);
    determining a depth of an object from the image sensor;
    generating a depth map; or
    adjusting a depth of field associated with the image sensor.

13. The device of claim 1, wherein:
the at least two PD pixels include:
a third pixel configured to capture image data from a first perspective; and
a fourth pixel configured to capture image data from a second perspective; and
the processor, in performing aperture simulation, is configured to associate captured image data from the third pixel and the fourth pixel with a third exposure region corresponding to a third aperture size.

14. The device of claim 13, wherein the processor, in associating captured image data from the third pixel and the fourth pixel with the third exposure region, is configured to:
combine the captured image data from the third pixel and the captured image data from the fourth pixel; and
determine a difference between the combined captured image data and the captured image data from at least one of:
the first pixel; or
the second pixel.

15. The device of claim 14, wherein the processor, in determining the difference, is configured to:
add the captured image data from the third pixel and the captured image data from the fourth pixel;
average the captured image data from the first pixel and the captured image data from the second pixel; and
determine a difference between the added captured image data and the averaged captured image data.

16. The device of claim 1, wherein the processor is configured to generate a high dynamic range (HDR) image from at least one frame of captured image data based on the aperture simulation.

17. The device of claim 16, wherein, to generate the HDR image, the processor is configured to:
associate captured image data from the first pixel associated with the first exposure region of each quad with a first frame of captured image data using the first aperture size;
associate captured image data from the second pixel associated with the second exposure region of each quad with a second frame of captured image data using the second aperture size; and
associate captured image data associated with a third exposure region of each quad with a third frame of captured image data using the third aperture size.

18. A method, comprising:
capturing one or more frames of image data by a quad color filter array (CFA) image sensor, wherein the quad CFA image sensor includes:
a quad CFA including a plurality of color filters; and
an image sensor configured to capture image data, the image sensor coupled to the quad CFA, wherein the image sensor includes a plurality of quads including a plurality of pixels, wherein for a first quad of the plurality of quads:
each pixel of a plurality of pixels of the first quad is coupled to a same color filter of the plurality of color filters;
a first pixel of the plurality of pixels of the first quad is associated with a first exposure region of the first quad and corresponds to a first aperture size;
a second pixel of the plurality of pixels of the first quad is associated with a second exposure region of the first quad and corresponds to a second aperture size; and
at least two pixels of the plurality of pixels of the first quad are configured as phase detection (PD) pixels; and
performing aperture simulation in processing the one or more frames of image data to simulate capturing image data using at least one of the first aperture size, the second aperture size, or a third aperture size based on the at least two PD pixels.

19. The method of claim 18, wherein capturing the one or more frames of image data includes capturing the one or more frames of image data using a quad Bayer CFA coupled to the image sensor, wherein:
the quad Bayer CFA includes a plurality of 4×4 color filter arrangements, a 4×4 color filter arrangement of the plurality of 4×4 color filter arrangements including:
a 2×2 patch of red color filters coupled to the first quad of the image sensor;
a 2×2 patch of blue color filters coupled to a second quad of the image sensor;
a first 2×2 patch of green color filters coupled to a third quad of the image sensor; and
a second 2×2 patch of green color filters coupled to a fourth quad of the image sensor, wherein the first quad, the second quad, the third quad, and the fourth quad are arranged in a Bayer color filter pattern.

20. The method of claim 18, wherein capturing the one or more frames of image data further comprises:
capturing image data by the first pixel;
capturing image data by the second pixel; and
capturing image data by the at least two PD pixels, comprising:
capturing image data from a first perspective by a third pixel; and
capturing image data from a second perspective by a fourth pixel, wherein the captured image data from the third pixel and the captured image data from the fourth pixel are associated with a third exposure region of the first quad corresponding to a third aperture size.

21. The method of claim 20, further comprising for each quad:
directing light to the photosensitive surfaces of the third pixel and the fourth pixel by a shared microlens coupled to the third pixel and the fourth pixel.

22. The method of claim 20, wherein capturing image data by the third pixel and the fourth pixel of each quad includes:
capturing image data from the first perspective and the second perspective oriented in a first direction for a first group of the plurality of quads.

23. The method of claim 22, wherein capturing image data by the third pixel and the fourth pixel of each quad further includes:
capturing image data from the first perspective and the second perspective oriented in a second direction for a second group of the plurality of quads.

24. The method of claim 18, further comprising generating, by a processor, a high dynamic range (HDR) image from at least one frame of captured image data based on the aperture simulation.

25. The method of claim 24, wherein generating the HDR image comprises:
associating captured image data from the first pixel associated with the first exposure region of each quad with a first frame of captured image data using the first aperture size;
associating captured image data from the second pixel associated with the second exposure region of each quad with a second frame of captured image data using the second aperture size; and associating captured image data associated with a third exposure region of each quad with a third frame of captured image data using the third aperture size.

26. A non-transitory, computer-readable medium storing instructions that, when executed by one or more processors of a device, cause the device to:

capture one or more frames of image data by a quad color filter array (CFA) image sensor, wherein the quad CFA image sensor includes:

a quad CFA including a plurality of color filters; and an image sensor configured to capture image data, the image sensor coupled to the quad CFA, wherein the image sensor includes a plurality of quads including a plurality of pixels, wherein for a first quad of the plurality of quads:

each pixel of a plurality of pixels of the first quad is coupled to a same color filter of the plurality of color filters;

a first pixel of the plurality of pixels of the first quad is associated with a first exposure region of the first quad and corresponds to a first aperture size;

a second pixel of the plurality of pixels of the first quad is associated with a second exposure region of the first quad and corresponds to a second aperture size; and at least two pixels of the plurality of pixels of the first quad are configured as phase detection (PD) pixels; and perform aperture simulation in processing the one or more frames of image data to simulate capturing image data using at least one of the first aperture size, the second aperture size, or a third aperture size based on the at least two PD pixels.

27. The computer-readable medium of claim 26, wherein capturing the one or more frames of image data includes capturing the one or more frames of image data using a quad Bayer CFA coupled to the image sensor, wherein:

the quad Bayer CFA includes a plurality of 4×4 color filter arrangements, a 4×4 color filter arrangement of the plurality of 4×4 color filter arrangements including:

a 2×2 patch of red color filters coupled to the first quad of the image sensor;

a 2×2 patch of blue color filters coupled to a second quad of the image sensor;

a first 2×2 patch of green color filters coupled to a third quad of the image sensor; and a second 2×2 patch of green color filters coupled to a fourth quad of the image sensor, wherein the first quad, the second quad, the third quad, and the fourth quad are arranged in a Bayer color filter pattern.

28. The computer-readable medium of claim 26, wherein capturing the one or more frames of image data further comprises:

capturing image data by the first pixel;

capturing image data by the second pixel; and capturing image data by the at least two PD pixels, comprising:

capturing image data from a first perspective by a third pixel; and capturing image data from a second perspective by a fourth pixel, wherein the captured image data of the third pixel and the captured image data of the fourth pixel are associated with a third exposure region of the first quad corresponding to a third aperture size.

29. The computer-readable medium of claim 26, wherein execution of the instructions further cause the device to detect one or more phases from the captured image data for a depth-based operation.

30. A device, comprising:

means for capturing one or more frames of image data by a quad color filter array (CFA) image sensor, wherein the quad CFA image sensor includes:

a quad CFA including a plurality of color filters; and an image sensor configured to capture image data, the image sensor coupled to the quad CFA, wherein the image sensor includes a plurality of quads including a plurality of pixels, wherein for a first quad of the plurality of quads:

each pixel of a plurality of pixels of the first quad is coupled to a same color filter of the plurality of color filters;

a first pixel of the plurality of pixels of the first quad is associated with a first exposure region of the first quad and corresponds to a first aperture size;

a second pixel of the plurality of pixels of the first quad is associated with a second exposure region of the first quad and corresponds to a second aperture size;

a third pixel of the plurality of pixels of the first quad is configured to capture image data from a first perspective; and a fourth pixel of the plurality of pixels is configured to capture image data from a second perspective, wherein the third pixel and the fourth pixel are phase detection (PD) pixels and are associated with a third exposure region of the first quad and correspond to a third aperture size; and means for performing aperture simulation in processing the one or more frames of image data to simulate capturing image data using at least one of the first aperture size, the second aperture size, or the third aperture size based on the at least two PD pixels.

* * * * *